(12) United States Patent
Ohkubo et al.

(10) Patent No.: US 7,203,508 B2
(45) Date of Patent: Apr. 10, 2007

(54) MOBILE COMMUNICATION SYSTEMS, MOBILE COMMUNICATION METHODS, BASE STATIONS, MOBILE STATIONS, AND SIGNAL TRANSMISSION METHODS IN THE MOBILE COMMUNICATION SYSTEMS

(75) Inventors: Shinzo Ohkubo, Yokosuka (JP); Hitoshi Yoshino, Yokosuka (JP); Shiro Kikuchi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 707 days.

(21) Appl. No.: 10/166,652

(22) Filed: Jun. 12, 2002

(65) Prior Publication Data

US 2003/0003937 A1 Jan. 2, 2003

(30) Foreign Application Priority Data

Jun. 13, 2001 (JP) ............................ P2001-178999
Jun. 20, 2001 (JP) ............................ P2001-186910

(51) Int. Cl.
*H04B 7/00* (2006.01)
(52) U.S. Cl. ........................................ 455/510; 455/69
(58) Field of Classification Search ................ 455/561, 455/522, 59, 69, 703, 510, 525, 574, 422; 375/295, 134; 370/320, 480
See application file for complete search history.

(56) References Cited

U.S. PATENT DOCUMENTS 4,797,947 A 1/1989 Labedz

| | | |
|---|---|---|
| 5,614,914 A | 3/1997 | Bolgiano et al. |
| 6,600,933 B1* | 7/2003 | Hiramatsu et al. .......... 455/561 |
| 2002/0003783 A1 | 1/2002 | Niemela et al. |
| 2002/0009157 A1* | 1/2002 | Sipola ........................ 375/295 |
| 2002/0075841 A1* | 6/2002 | Steer et al. ................. 370/344 |

FOREIGN PATENT DOCUMENTS

| | | |
|---|---|---|
| CN | 1248835 | 3/2000 |
| EP | 0 288 904 | 11/1988 |
| EP | 0 419 243 | 3/1991 |
| EP | 0 984 647 | 3/2000 |
| WO | WO 01/18991 | 3/2001 |
| WO | WO 01/24553 A1 | 4/2001 |

* cited by examiner

*Primary Examiner*—Nay Maung
*Assistant Examiner*—Tu X. Nguyen
(74) *Attorney, Agent, or Firm*—Oblon, Spivak, McClelland, Maier & Neustadt, P.C.

(57) ABSTRACT

A mobile station is configured to measure receiving qualities of respective signals from a first antenna and a second antenna of a base station (S3, S5), store the results of the measurement, and request the base station to retransmit a signal from an antenna with a higher receiving quality, based on the stored measurement results, when an error is detected in received data thereafter (S10, S11, S12). The base station retransmits the data, using the antenna with the higher receiving quality (i.e., a base station antenna to yield the higher receiving quality at the mobile station) (S15). In another aspect, the mobile station measures a receiving quality of a signal and notifies the base station of the receiving quality. The base station selects a radio channel adapted to a receiving quality on the basis of the measurement result and transmits a signal, using the radio channel.

16 Claims, 16 Drawing Sheets

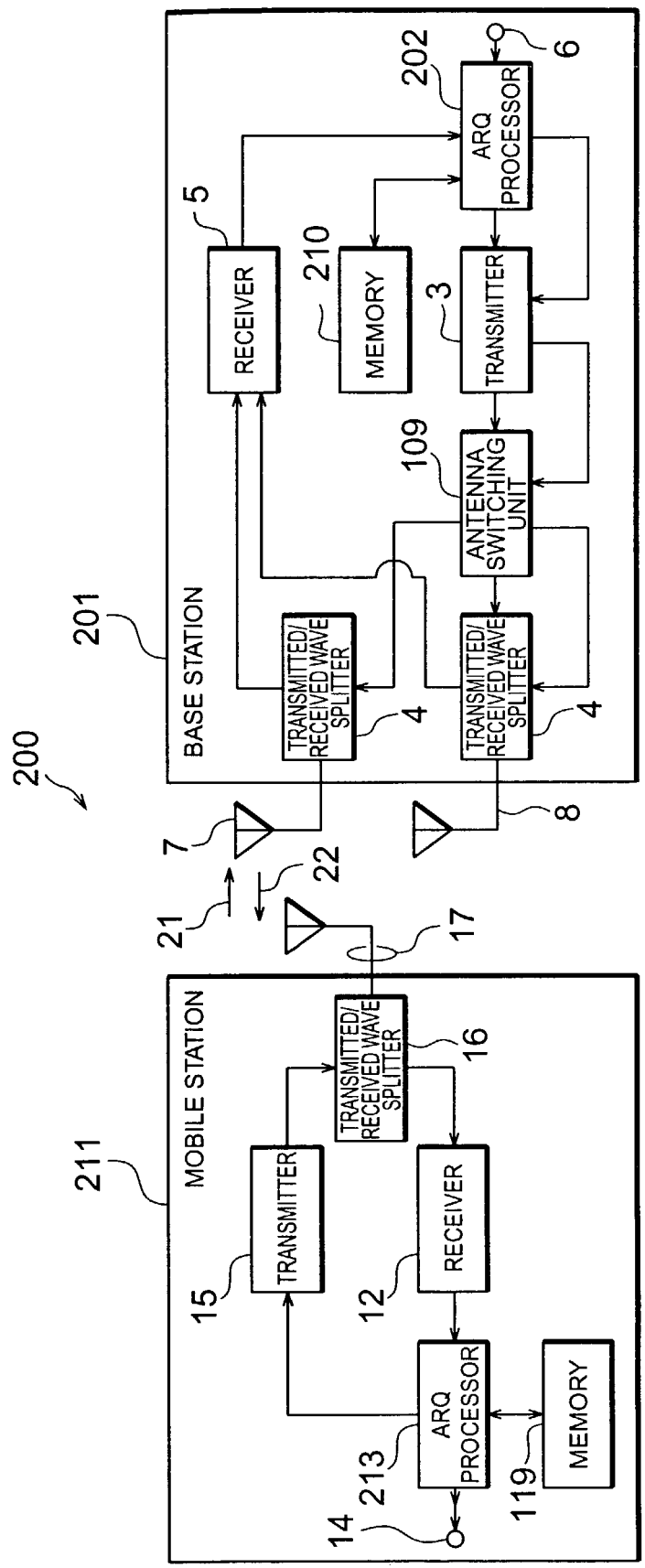

MOBILE COMMUNICATION SYSTEMS, MOBILE COMMUNICATION METHODS, BASE STATIONS, MOBILE STATIONS, AND SIGNAL TRANSMISSION METHODS IN THE MOBILE COMMUNICATION SYSTEMS

BACKGROUND OF THE INVENTION

1. Field of the Invention

The present invention relates to mobile communication systems, mobile communication methods, base stations, and mobile stations and, more particularly, to a mobile communication system comprising a mobile station and a base station equipped with a plurality of antennas and configured to perform signal transmission/reception control including signal retransmission control by the base station on the basis of an automatic repeat request from the mobile station, a mobile communication method executed by the mobile communication system, and the base station and the mobile station constituting the mobile communication system.

The present invention also relates to signal transmitting methods and systems in mobile communication systems and, more particularly, to a signal transmitting method and system in a mobile communication system configured to perform transmission/reception of a signal while transmitting and receiving an automatic repeat request, the signal transmitting method and system being configured to transmit the signal while changing channels one from another so as to improve the receiving quality at the mobile station.

Further, the present invention relates to base stations that can perform communication according to the aforementioned signal transmitting methods.

The present invention also relates to mobile stations performing communication according to the foregoing signal transmitting methods.

2. Related Background Art

FIG. 1 is a block diagram of a conventional mobile communication system 10, and FIG. 2 a chart for explaining the cooperative operation of the conventional mobile communication system with an automatic repeat request. At a base station 1, an ARQ (Automatic Repeat Request) processor 2 accepts input data addressed to a mobile station 11 through a data input terminal 6. The ARQ processor 2 attaches error-detectable parity such as CRC (Cyclic Redundancy Checking code) or the like to the data so as to enable detection of an error occurring during transmission, thereafter stores the data (A1 in FIG. 2), and outputs the data to a transmitter 3. The transmitter 3 modulates the input data into a transmitted signal and then transmits the signal through a transmitted/received wave splitter 4 and from a first base station antenna 7 to the mobile station 11 through a downlink 22 (A2).

At the mobile station 11, a receiver 12 receives the signal from a mobile station antenna 17 through a transmitted/received wave splitter 16. Then the signal received at the receiver 12 is fed as received data to an ARQ processor 13 (A3). The ARQ processor 13 performs detection of error using the CRC (A4).

When no error is detected in the received data herein, the ARQ processor 13 outputs the received data from a data output terminal 14 and outputs an acknowledgement of arrival of the received data to a transmitter 15. The transmitter 15 transmits the acknowledgement of arrival of the received data to the ARQ processor 2 of the base station 1 through an uplink 21 (A5). Receiving the arrival acknowledgement, the ARQ processor 2 deletes the data stored for retransmission (A7 and A8).

When an error is detected in the received data at A4 on the other hand, the ARQ processor 13 sends a repeat request for retransmission of the received data to the ARQ processor 2 of the base station 1 through the uplink 21 (A6). Receiving the repeat request, the ARQ processor 2 retransmits the requested data from the first base station antenna 7 (A7 and A9).

FIG. 3 and FIG. 4 are a block diagram of another conventional mobile communication system and a flowchart for explaining the operation thereof. As shown in FIG. 3, the conventional mobile communication system is comprised of a base station 21 and a mobile station 31.

The base station 21 is generally comprised of an ARQ (Automatic Repeat Request) processor 22, a transmitter/receiver 23, a signal input terminal 24, and a base station antenna 25. The mobile station 31 on the other hand is generally comprised of a transmitter/receiver 32, an ARQ processor 33, a signal output terminal 34, and a mobile station antenna 35.

The operation of the conventional mobile communication system will be described below with reference to the flowchart of FIG. 4.

At the base station 21, the ARQ processor 22 receives an input signal addressed to the mobile station 31 through the signal input terminal 24. The ARQ processor 22 attaches the error-detectable parity such as the CRC (Cyclic Redundancy Checking code) or the like to the data so as to enable detection of an error occurring during transmission, thereafter stores the signal (B1), and outputs the signal to the transmitter/receiver 23. The transmitter/receiver 23 informs the mobile station of a start of transmission of the signal (B2) and thereafter transmits the signal to the mobile station 31 through a downlink 42 which is a frequency channel determined for transmission of the signal addressed to the mobile station (B3).

At the mobile station 31, the transmitter/receiver 32 receives the signal of the downlink 42 received by the mobile station antenna 35 (B4) and thereafter the signal is fed into the ARQ processor 33. The ARQ processor 33 performs the detection of error in the received signal, using the CRC. When no error is detected in the received signal (NO at B5), the received signal is outputted from the signal output terminal 34 and an acknowledgement of arrival of the received signal is transmitted to the ARQ processor 22 of the base station through an uplink 41 (B6) After that, the ARQ processor 22 receiving the arrival acknowledgement deletes the signal stored for retransmission (NO at B8, and B9).

When an error is detected in the received signal on the other hand (YES at B5), the ARQ processor 33 sends a repeat request for retransmission of the received signal to the ARQ processor 22 of the base station through the uplink 41 (B7). Then the ARQ processor 22 receiving the repeat request retransmits the requested signal in the frequency channel used for the preceding transmission (YES at B8, and B10).

SUMMARY OF THE INVENTION

In the method of transmitting the high-quality signal with the automatic repeat request in the conventional mobile communication system described with reference to FIGS. 1 and 2, however, since the signals were always transmitted with the use of the same base station antenna, a low receiving quality state due to fading or shadowing continued at a simple mobile station incapable of implementing receiving antenna diversity or at a mobile station staying long at an identical site, which posed the problem of degradation of throughput because of repetition of repeat requests.

An object of the present invention is therefore to decrease the repetition of repeat requests from the mobile station, thereby enhancing the throughput.

In order to achieve the above object, a mobile communication system according to the present invention is, as set forth in claim 1, a mobile communication system comprising a mobile station and a base station and configured to perform transmission/reception of a signal while sending and receiving an automatic repeat request, wherein the mobile station comprises: receiving quality measuring means for measuring a receiving quality of a radio signal transmitted from the base station; and request transmitting means for transmitting to the base station a radio resource use request for use of a radio resource adapted to a receiving quality, based on the measured receiving quality of the radio signal. The base station comprises: request receiving means for receiving the radio resource use request; and signal transmitting means for transmitting a signal addressed to the mobile station, including a signal under a request for retransmission by the automatic repeat request, using the radio resource requested by the radio resource use request.

In the mobile communication system the signal transmitting means transmits the signal by using radio resources in decreasing order of the number of repeat requests from the mobile station.

Further, in the mobile communication system as set forth in claim 2, the receiving quality is one selected from the following:

a received power;

$$C/(I+N) \quad (\text{Eq. 1})$$

C: carrier power
I: interference power
N: noise power;

$$S/(I+N) \quad (\text{Eq. 2})$$

S: signal power
I: interference power
N: noise power;

$$C/N \quad (\text{Eq. 3})$$

C: carrier power
N: noise power;

$$S/N \quad (\text{Eq. 4})$$

S: signal power
N: noise power;
an error rate;
a likelihood obtained in decoding of error correction code;
a transmission power value of the base station;
an increase amount or an attenuation amount of the transmission power of the base station;
a correlation value obtained by despreading of spreading code;
either of combinations of these.

In the mobile communication system as set forth in claim 3, the radio resource is at least one antenna, directivities of at least one antenna, a radio channel, a transmission path, or either of combinations of these. Here the antenna may be a single antenna or a plurality of antennas, and in the case of a plurality of antennas being used, directivities of the respective antennas may be different from each other. The transmission path is intended for a situation in which a signal is indirectly transmitted via a mobile station as a relay station (multihop connection).

In order to achieve the above object, a mobile communication system according to one embodiment of the present invention is a mobile communication system comprising a mobile station, and a base station equipped with a plurality of antennas, and configured to perform signal transmission/reception control including signal retransmission control by the base station on the basis of an automatic repeat request from the mobile station, wherein the mobile station comprises: quality measuring means for measuring receiving qualities of signals transmitted from the plurality of antennas of the base station; and request transmitting means for transmitting to the base station an antenna use request that a signal should be transmitted from at least one antenna out of the plurality of antennas, based on the receiving qualities of the signals from the respective antennas obtained by measurement, and wherein the base station comprises: request receiving means for receiving the antenna use request that the signal should be transmitted from at least one antenna out of the plurality of antennas; and signal transmitting means for transmitting a signal addressed to the mobile station, including the signal under the automatic repeat request for retransmission, from the antenna requested by the antenna use request.

A mobile communication method according to the present invention is, as set forth in claim 9, a mobile communication method which is executed by a mobile communication system comprising a mobile station, and a base station equipped with a plurality of antennas, and which is configured to perform signal transmission/reception control including signal retransmission control by the base station on the basis of an automatic repeat request from the mobile station, the mobile communication method comprising: a quality measuring step of, at the mobile station, measuring receiving qualities of signals transmitted from the plurality of antennas of the base station; a request transmitting step of, at the mobile station, transmitting to the base station an antenna use request that a signal should be transmitted from at least one antenna out of the plurality of antennas, based on the receiving qualities of the signals from the respective antennas obtained by the measurement; a request receiving step of, at the base station, receiving the antenna use request that the signal should be transmitted from at least one antenna out of the plurality of antennas; and a signal transmitting step of, at the base station, transmitting a signal addressed to the mobile station, including the signal under the automatic repeat request for retransmission, from the antenna requested by the antenna use request.

A base station according to the present invention is, as set forth in claim 14, a base station which is equipped with a plurality of antennas, constituting a mobile communication system, together with a mobile station requesting to transmit a signal from at least one antenna out of the plurality of antennas on the basis of receiving qualities of signals transmitted from the plurality of antennas, and which is configured to perform, with the mobile station, signal transmission/reception control including signal retransmission control based on an automatic repeat request from the mobile station, the base station comprising: request receiving means for receiving an antenna use request that a signal should be transmitted from at least one antenna out of the plurality of antennas; and signal transmitting means for transmitting a signal addressed to the mobile station, including the signal under the automatic repeat request for retransmission, from the antenna requested by the antenna use request.

A mobile station according to one embodiment of the present invention is a mobile station which is configured to perform signal transmission/reception control including signal retransmission control based on an automatic repeat request, with a base station equipped with a plurality of antennas and configured to transmit a signal on the basis of a signal transmission request from at least one antenna out of the plurality of antennas, the mobile station comprising: quality measuring means for measuring receiving qualities of signals transmitted from the plurality of antennas of the base station; and request transmitting means for transmitting to the base station an antenna use request that a signal should be transmitted from at least one antenna out of the plurality of antennas, based on the receiving qualities of the signals from the respective antennas obtained by measurement.

Incidentally, the foregoing mobile communication system, mobile communication method, base station, and mobile station according to the present invention are based on the same technical concept and they are aspects of the same technical concept as a mobile communication system, as a mobile communication method, as a base station, and as a mobile station.

The following will describe the means for solving the problem in the mobile communication system according to the present invention, but it is noted that the means for solving the problem in the mobile communication method, the base station, and the mobile station are also based on the same concept.

In the mobile communication system according to the present invention, at the mobile station the quality measuring means measures the receiving qualities of the signals transmitted from the plurality of antennas of the base station and the request transmitting means transmits to the base station the antenna use request that the signal should be transmitted from at least one antenna out of the plurality of antennas, based on the receiving qualities of the signals from the respective antennas acquired by the measurement. Namely, this request transmitting means transmits to the base station the antenna use request that the base station should transmit the signal from at least one antenna with the receiving quality of the signal better than those from the other antennas.

At the base station, the request receiving means receives the antenna use request from the foregoing mobile station, and then the signal transmitting means transmits the signal addressed to the mobile station, including the signal under the automatic repeat request for retransmission, from the antenna requested by the antenna use request.

Through this operation, the signal addressed to the mobile station is transmitted from at least one antenna with the receiving quality relatively better, based on the receiving qualities of the signals measured at the mobile station, and it is thus feasible to improve the receiving quality of the signal at the mobile station, to prevent the repetition of repeat requests from the mobile station, and to enhance the throughput.

The foregoing mobile communication system can also be applied to transmission of a multicast signal addressed to a plurality of mobile stations.

Namely, a mobile communication system according to one embodiment of the present invention is configured so that at the mobile station the quality measuring means measures receiving qualities of signals transmitted from the plurality of antennas of the base station and the request transmitting means transmits to the base station an antenna use request that a multicast signal should be transmitted from at least one antenna out of the plurality of antennas, based on the receiving qualities of the signals from the respective antennas acquired by the measurement. Namely, this request transmitting means transmits to the base station the antenna use request that the base station should transmit the multicast signal from at least one antenna with the receiving quality of the signal better than those from the other antennas.

At the base station the request receiving means receives the antenna use request from the mobile station, and then multicast signal transmitting means transmits a multicast signal addressed to the mobile station, including the multicast signal under the automatic repeat request for retransmission, from the antenna requested by the antenna use request.

Through this operation, the multicast signal addressed to the mobile station is transmitted from at least one antenna with the receiving quality relatively better, based on the receiving qualities of the signals measured at the mobile station, and it is thus feasible to improve the receiving quality of the multicast signal at the mobile station, to prevent the repetition of repeat requests from the mobile station, and to enhance the throughput.

In the foregoing configuration, however, there can occur cases where the antenna use requests from a plurality of mobile stations are present over two or more antennas, but the system can be configured so that when antenna use requests from a plurality of mobile stations are present over two or more antennas, the multicast signal transmitting means transmits the multicast signal, using the antennas in descending order of the number of requests. In this configuration, as the entire system, it is feasible to improve the receiving quality of the multicast signal at more mobile stations, to decrease the total number of occurrences of repeat requests, and to enhance the total throughput of the entire system.

The invention according to one embodiment can be described as follows from the view points of the mobile communication method, the base station, and the mobile station.

Namely, a mobile communication method as set forth in claim 10 is a mobile communication method which is executed by a mobile communication system comprising a plurality of mobile stations, and a base station equipped with a plurality of antennas and which is configured to perform signal transmission/reception control including signal retransmission control by the base station on the basis of an automatic repeat request from a mobile station, the mobile communication method comprising: a quality measuring step of, at the mobile station, measuring receiving qualities of signals transmitted from the plurality of antennas of the base station; a request transmitting step of, at the mobile station, transmitting to the base station an antenna use request that a multicast signal should be transmitted from at least one antenna out of the plurality of antennas, based on the receiving qualities of the signals from the respective antennas obtained by the measurement; a request receiving step of, at the base station, receiving the antenna use request that the multicast signal should be transmitted from at least one antenna out of the plurality of antennas; and a multicast signal transmitting step of, at the base station, transmitting a multicast signal addressed to the mobile station, including the multicast signal under the automatic repeat request for retransmission, from the antenna requested by the antenna use request.

A mobile communication method according to another embodiment of the invention is the mobile communication method according to claim 10, wherein in the multicast signal transmitting step, when antenna use requests from the plurality of mobile stations are present over two or more antennas, the base station transmits the multicast signal by using the antennas in descending order of the number of requests.

A base station as set fort in claim 15 is a base station which is equipped with a plurality of antennas, constituting a mobile communication system, together with a plurality of mobile stations requesting to transmit a multicast signal from at least one antenna out of the plurality of antennas on the basis of receiving qualities of signals transmitted from the plurality of antennas, and which is configured to perform, with the mobile stations, signal transmission/reception control including multicast signal retransmission control based on an automatic repeat request from the mobile stations, the base station comprising: request receiving means for receiving an antenna use request that a multicast signal should be transmitted from at least one antenna out of the plurality of antennas; and multicast signal transmitting means for transmitting a multicast signal addressed to the mobile station, including the multicast signal under the automatic repeat request for retransmission, from the antenna requested by the antenna use request.

A base station according to one embodiment of the present invention is a base station, wherein when antenna use requests from the plurality of mobile stations are present over two or more antennas, the multicast signal transmitting means transmits the multicast signal by using the antennas in decreasing order of the number of requests.

A mobile station according to one embodiment of the present invention is a mobile station which is configured to perform signal transmission/reception control including multicast signal retransmission control based on an automatic repeat request, with a base station equipped with a plurality of antennas and configured to transmit a multicast signal on the basis of a signal transmission request from at least one antenna out of the plurality of antennas, the mobile station comprising: quality measuring means for measuring receiving qualities of signals transmitted from the plurality of antennas of the base station; and request transmitting means for transmitting to the base station an antenna use request that a multicast signal should be transmitted from at least one antenna out of the plurality of antennas, based on the receiving qualities of the signals from the respective antennas obtained by measurement.

The foregoing mobile communication system may be configured so that when receiving the antenna use request, the request receiving means of the base station performs antenna reception in a diversity system. The diversity reception is generally classified under three methods, the selection combining method using a signal from an antenna with the maximum level out of a plurality of antennas, the equal-gain combining method of combining outputs from the plurality of antennas as they are, and the maximal-ratio combining method of combining outputs with respective weights according to their levels. The request receiving means of the base station may employ any one of these methods. By performing the antenna reception by these diversity methods, it is feasible to implement stable reception of the antenna use request.

Likewise, a mobile communication method as set forth in claim 11 is the mobile communication method according to claim 9 or 10 wherein in the request receiving step, when receiving the antenna use request, the base station performs antenna reception in a diversity system. A base station as set forth in claim 16 is the base station according to claim 14 or 15 wherein when receiving the antenna use request, the request receiving means performs antenna reception in a diversity system.

In the mobile communication system according to one embodiment of the present invention when at the mobile station the quality measuring means measures the receiving qualities of the signals transmitted from the plurality of antennas of the base station, the signals as measured objects are not limited to specific signals, but can be selected from various signals. Specifically, as set forth in claim 7, the quality measuring means can measure the receiving quality by using a synchronization signal, a signal of annunciation information, an individual signal to the mobile station, a multicast signal, or a combination of two or more out of these signals, transmitted from at least one antenna of the base station.

Likewise, a mobile communication method as set forth in claim 12 is the mobile communication method according to either one of claims 9, 10 and 11, wherein in the quality measuring step, the mobile station measures the receiving quality by using a synchronization signal, a signal of annunciation information, an individual signal to the mobile station, a multicast signal, or a combination of two or more out of these, transmitted from at least one antenna of the base station. A mobile station according to one embodiment of the present invention is configured so that the quality measuring means measures the receiving quality by using a synchronization signal, a signal of annunciation information, an individual signal to the mobile station, a multicast signal, or a combination of two or more out of these signals, transmitted from at least one antenna of the base station.

The physical quantity used as the receiving quality measured at this time is not limited to a specific physical quantity, either, but it can be selected from various physical quantities. Specifically, as set forth in claim 8, the receiving quality can be a received power, a value obtained by dividing a carrier power by the sum of an interference power and a noise power (C/(I+N)), a value obtained by dividing a signal power by the sum of an interference power and a noise power (S/(I+N)), an error rate, a likelihood obtained in decoding of error correction code, a C/N ratio (Carrier to Noise Ratio), an S/N ratio (Signal to Noise Ratio), a correlation value obtained by despreading of spreading code, or a combination of two or more out of these.

Likewise, a mobile communication method as set forth in claim 13 is the mobile communication method according to either one of claims 9–10 and 11–12 wherein the receiving quality is a received power, a value obtained by dividing a carrier power by the sum of an interference power and a noise power, a value obtained by dividing a signal power by the sum of an interference power and a noise power, an error rate, a likelihood obtained in decoding of error correction code, a C/N ratio, an S/N ratio, a correlation value obtained by despreading of spreading code, or a combination of two or more out of these. A mobile station according to one embodiment is configured such that the receiving quality is a received power, a value obtained by dividing a carrier power by the sum of an interference power and a noise power, a value obtained by dividing a signal power by the sum of an interference power and a noise power, an error rate, a likelihood obtained in decoding of error correction code, a C/N ratio, an S/N ratio, a correlation value obtained by despreading of spreading code, or a combination of two or more out of these.

According to the present invention, as described above, the signal addressed to the mobile station (including the multicast signal) is transmitted from at least one antenna with the receiving quality relatively better, based on the receiving qualities of the signals measured at the mobile station, and it is thus feasible to improve the receiving quality of the signal at the mobile station, to prevent the repetition of repeat requests from the mobile station, and to enhance the throughput.

When the present invention is applied in combination with site diversity, use of plural base stations provides the effect of increasing the diversity gain against shadowing, and the control time can be unlimitedly shortened by the feature of the present invention of using plural antennas in one base station. This makes it feasible to realize large diversity gain against fading. The maximum diversity gain can be achieved by applying the site diversity to the present invention in this way.

In the conventional mobile communication system, as described with reference to FIGS. 3 and 4, the base station transmits the signal in only the determined frequency channel for transmission of the signal addressed to the mobile station. Therefore, a simple mobile station incapable of implementing receiving antenna diversity, or a mobile station staying long at an identical site remained in a low receiving quality state due to fading or shadowing, thus posing the problem of degrading the throughput because of the repetition of repeat requests.

An object of the present invention is therefore to decrease the repetition of repeat requests from the mobile station to enhance the throughput, as described above.

In order to accomplish the above object, the present invention provides a signal transmitting method in a mobile communication system comprising a mobile station and a base station and configured to perform transmission/reception of a signal while sending and receiving an automatic repeat request, the signal transmitting method being carried out as follows in the mobile communication system: the mobile station measures a receiving quality of a radio signal transmitted from the base station, the mobile station notifies the base station of the receiving quality of the radio signal thus measured, and the base station transmits a signal under a repeat request from the mobile station so as to meet a required receiving quality of the mobile station, based on the receiving quality thus notified of.

According to the present invention, the base station transmits the signal under the repeat request from the mobile station so as to meet the required receiving quality at the mobile station, based on the receiving quality of the radio signal notified of by the mobile station, and it is thus feasible to avoid the continuation of the low receiving quality state due to fading or shadowing as suffered before. As a consequence, the repetition of repeat requests from the mobile station can be decreased, and it is feasible to enhance the throughput.

Concerning the radio signal from the base station measured at the mobile station the signal transmitting method is configured so that the radio signal transmitted from the base station becomes at least one radio channel.

A type of the radio channel from the base station measured at the base station is selected, so that the mobile station uses, as a radio channel for measurement of the receiving quality, an annunciation information channel or an individual channel or a multicast channel or a combination of these, among said at least one radio channel transmitted from the base station.

According to the present invention, any radio channel can be used for the measurement of the receiving quality at the mobile station as long as it is a radio channel transmitted from the base station.

The receiving quality of the radio channel measured at the mobile station is selected as in the signal transmitting method, discussed above the receiving quality is one selected from the following:

a received power;

$$C/(I+N) \qquad \text{(Eq. 1)}$$

C: carrier power
I: interference power
N: noise power;

$$S/(I+N) \qquad \text{(Eq. 2)}$$

S: signal power
I: interference power
N: noise power;

$$C/N \qquad \text{(Eq. 3)}$$

C: carrier power
N: noise power;

$$S/N \qquad \text{(Eq. 4)}$$

S: signal power
N: noise power;
an error rate;
a likelihood obtained in decoding of error correction code;
a transmission power value of the base station;
an increase amount or an attenuation amount of the transmission power of the base station;
either of combinations of these.

Further, radio channels used in radio transmission between the mobile station and the base station are selected in a signal transmission wherein radio channels transmitted and received between the base station and the mobile station are at least one of subcarrier channels, orthogonal subcarrier channels, frequency channels, and frequency channels in different frequency bands.

According to the present invention, the radio channels are selected depending upon the transmission methods for transmission/reception of signals between the base station and the mobile station: the subcarrier channels in the multicarrier transmission system; the orthogonal subcarrier channels in the OFDM transmission system; the frequency channels in the FDM transmission system; the frequency channels in different frequency bands in the multiband transmission system.

From the viewpoint of enabling the notification of the measured receiving quality on the occasion of the mobile station sending the repeat request to the base station, the present invention provides a signal transmitting method wherein when a repeat request for retransmission of a received signal is needed, the mobile station notifies the base station of the repeat request, together with the receiving quality of the radio signal measured.

From the viewpoint of enabling the notification of the measured receiving quality on the occasion of the mobile station sending an arrival acknowledgement of a received packet to the base station, the present invention provides a signal transmitting method wherein on an occasion of notifying the base station of an acknowledgement of arrival of a received signal, the mobile station notifies the base station of the receiving quality of said at least one radio channel measured.

The information on the receiving quality sent from the mobile station to the base station is one as in a signal transmitting method, wherein the mobile station notifies the base station of a number of at least one radio channel and a receiving quality of the radio channel, or of only a channel number of a receiving quality within a predetermined range, as the receiving quality of said at least one radio channel measured.

The information on the receiving quality is one as in a signal transmitting method, wherein the mobile station notifies the base station of a number of at least one radio channel satisfying a required receiving quality, including a radio channel with a maximum receiving quality at the mobile station, together with the receiving quality achieved.

From the viewpoint of transmitting signals by changing radio channels used for transmission of signals so as to improve the receiving quality at the mobile station, the present invention provides, a signal transmitting method wherein the base station determines a radio channel satisfying the required receiving quality at the mobile station on the basis of notification from the mobile station, and the base station transmits a signal under a repeat request from the mobile station, using the radio channel determined.

According to the present invention, the base station transmits the signal under the repeat request from the mobile station by changing the radio channels one from another so as to permit the mobile station receive the signal with the required receiving quality, based on the receiving quality notified of by the mobile station, and thus the base station does not always have to use the predetermined radio channel for transmission of the signal addressed to the mobile station, different from the conventional systems. Namely, the base station adaptively changes the radio channels one from another so as to improve the receiving quality at the mobile station, so that the mobile station becomes able to receive the signal with a better receiving quality, resulting in decreasing the repetition of repeat requests. In conjunction therewith, it becomes feasible to enhance the throughput.

From the viewpoint that after the change of the radio channel as described above the base station also transmits a signal addressed to the mobile station through the use of the radio channel, so as to enable maintenance of the required receiving quality at the mobile station, the present invention provides a signal transmitting method wherein after transmitting the signal under the repeat request from the mobile station, using the determined radio channel, the base station also transmits a signal addressed to the mobile station, using the determined radio channel.

From the viewpoint of decreasing interference with other mobile stations, the present invention provides a signal transmitting method wherein, based on the notification from the mobile station, the base station determines a number of a radio channel which satisfies the required receiving quality at the mobile station and through which the signal is transmitted so that a transmission power from the base station becomes a predetermined value, and also determines a transmission power of the radio channel.

According to the present invention, when receiving a repeat request from the mobile station, the base station transmits the signal requested by the repeat request, using the radio channel satisfying the required receiving quality at the mobile station and maintaining the transmission power from the base station at a predetermined value. Accordingly, when the predetermined value is set at a minimum value, the mobile station can receive the signal requested by the repeat request, with the required receiving quality even if the transmission power from the base station is minimum. Namely, since the signal is transmitted at the minimum transmission power from the base station, it is feasible to reduce the interference with the other mobile stations not receiving the signal under the repeat request.

From the viewpoint of improving the receiving quality of the signal received at the mobile station even in the multicast transmission of transmitting an identical signal to a plurality of mobile stations, the present invention provides a signal transmitting method wherein when the base station transmits an identical multicast signal to a plurality of mobile stations, the base station determines a number of at least one radio channel which satisfies the required receiving quality at each mobile station and through which the multicast signal is transmitted so that a transmission power from the base station becomes a predetermined value, and also determines a transmission power of the radio channel, based on notification from each mobile station.

The present invention also provides a signal transmitting method wherein when the base station transmits the identical multicast signal to the plurality of mobile stations, the base station determines a number of a radio channel that can be assumed to have the greatest number of repeat requests from the mobile stations, out of channel numbers with receiving qualities within a predetermined range, notified of by the respective mobile stations.

Further, the present invention provides a mobile communication system comprising a mobile station and a base station and configured to perform transmission/reception of a signal while sending and receiving an automatic repeat request, wherein the mobile station comprises: receiving quality measuring means for measuring a receiving quality of a radio signal transmitted from the base station; and receiving quality notifying means for notifying the base station of the receiving quality of the radio signal thus measured, and wherein the base station comprises: transmitting means for transmitting a signal under a repeat request from the mobile station so that a required receiving quality is satisfied at the mobile station, based on the receiving quality notified of by the mobile station.

The present invention also provides a base station in a mobile communication system comprising a mobile station and the base station and configured to perform transmission/reception of a signal while sending and receiving an automatic repeat request, the base station comprising transmitting means for transmitting a signal under a repeat request from the mobile station so that a required receiving quality is satisfied at the mobile station, based on a receiving quality notified of by the mobile station.

Further, the present invention provides a mobile station in a mobile communication system comprising the mobile station and a base station and configured to perform transmission/reception of a signal while sending and receiving an automatic repeat request, the mobile station comprising: receiving quality measuring means for measuring a receiving quality of a radio signal transmitted from the base station; and receiving quality notifying means for notifying the base station of the receiving quality of the radio signal thus measured.

The present invention will become more fully understood from the detailed description given hereinbelow and the accompanying drawings which are given by way of illustration only, and thus are not to be considered as limiting the present invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

A mobile communication system according to one embodiment of the present invention is configured so that the base station comprises radio resource determining means for determining a radio resource satisfying the required receiving quality at the mobile station on the basis of notification from the mobile station; and signal transmitting means for transmitting the signal under the repeat request from the mobile station, using the radio resource determined by the radio resource determining means.

Further, in the mobile communication system according to one embodiment of the present invention the transmitting means transmits the signal by using radio resources in decreasing order of the number of repeat requests from the mobile station.

In the mobile communication system according to one embodiment of the present invention the radio resource is at least one antenna, directivities of at least one antenna, a radio channel, a transmission path, or either of combinations of these. Here the antenna may be a single antenna or a plurality of antennas, and in the case of a plurality of antennas being used, directivities of the respective antennas may be different from each other. The transmission path is intended for a situation in which a signal is indirectly transmitted via a mobile station as a relay station (multihop connection).

BRIEF DESCRIPTION OF THE DRAWINGS

FIG. 8 is a block diagram of a mobile communication system in the second embodiment of the present invention.

DESCRIPTION OF THE PREFERRED EMBODIMENTS

First Embodiment

Figure 1:
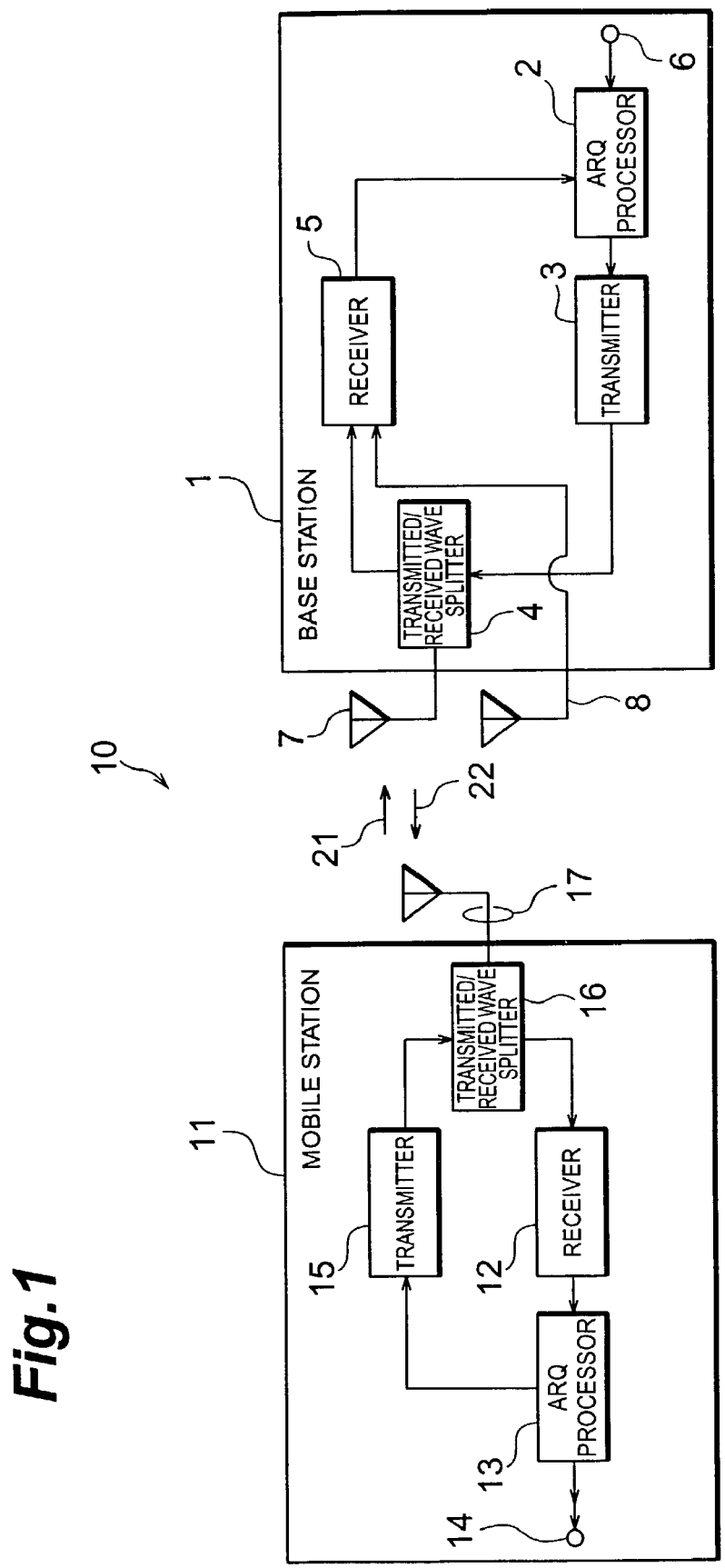
FIG. 1 is a block diagram of a conventional mobile communication system.
Figure 2:
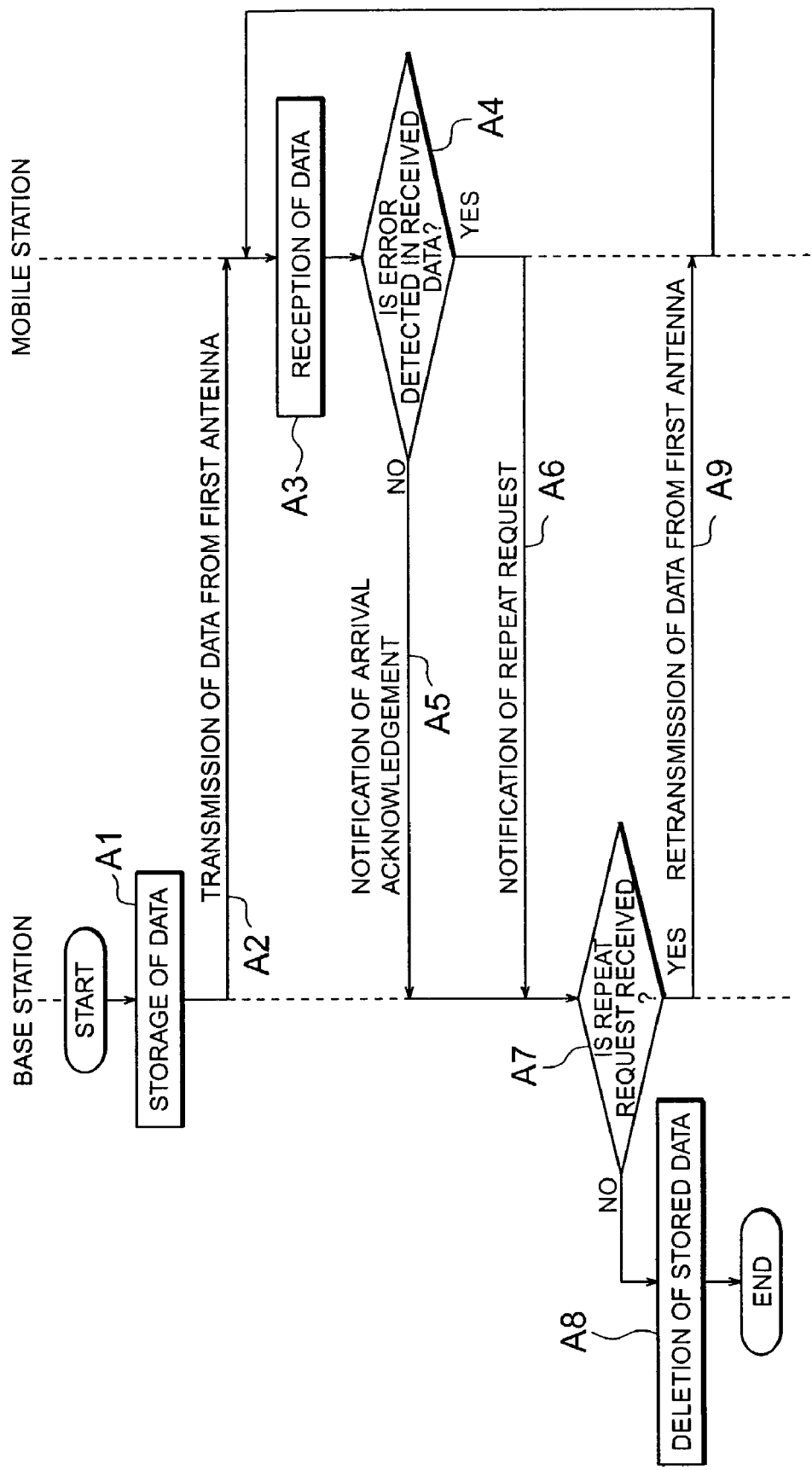
FIG. 2 is a chart for illustrating the cooperative operation of the conventional mobile communication system with the automatic repeat request.
Figure 3:
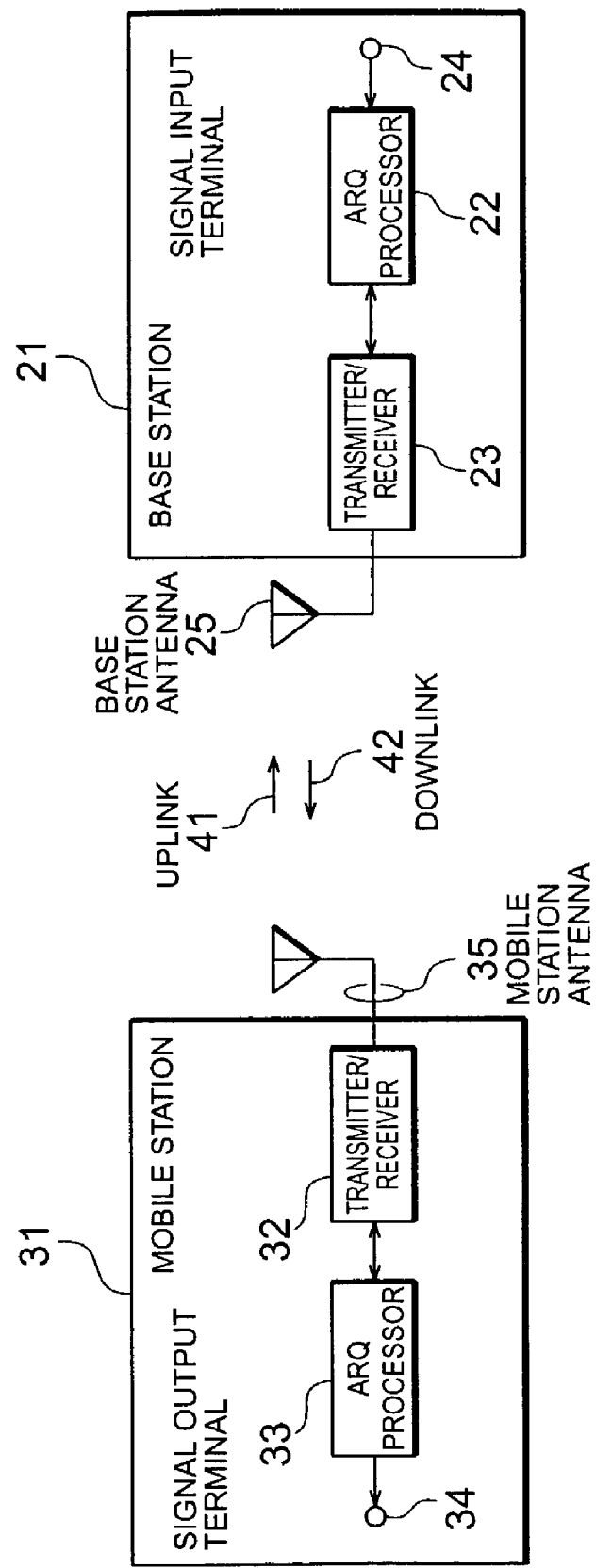
FIG. 3 is a block diagram of another conventional mobile communication system with the automatic repeat request.
Figure 4:
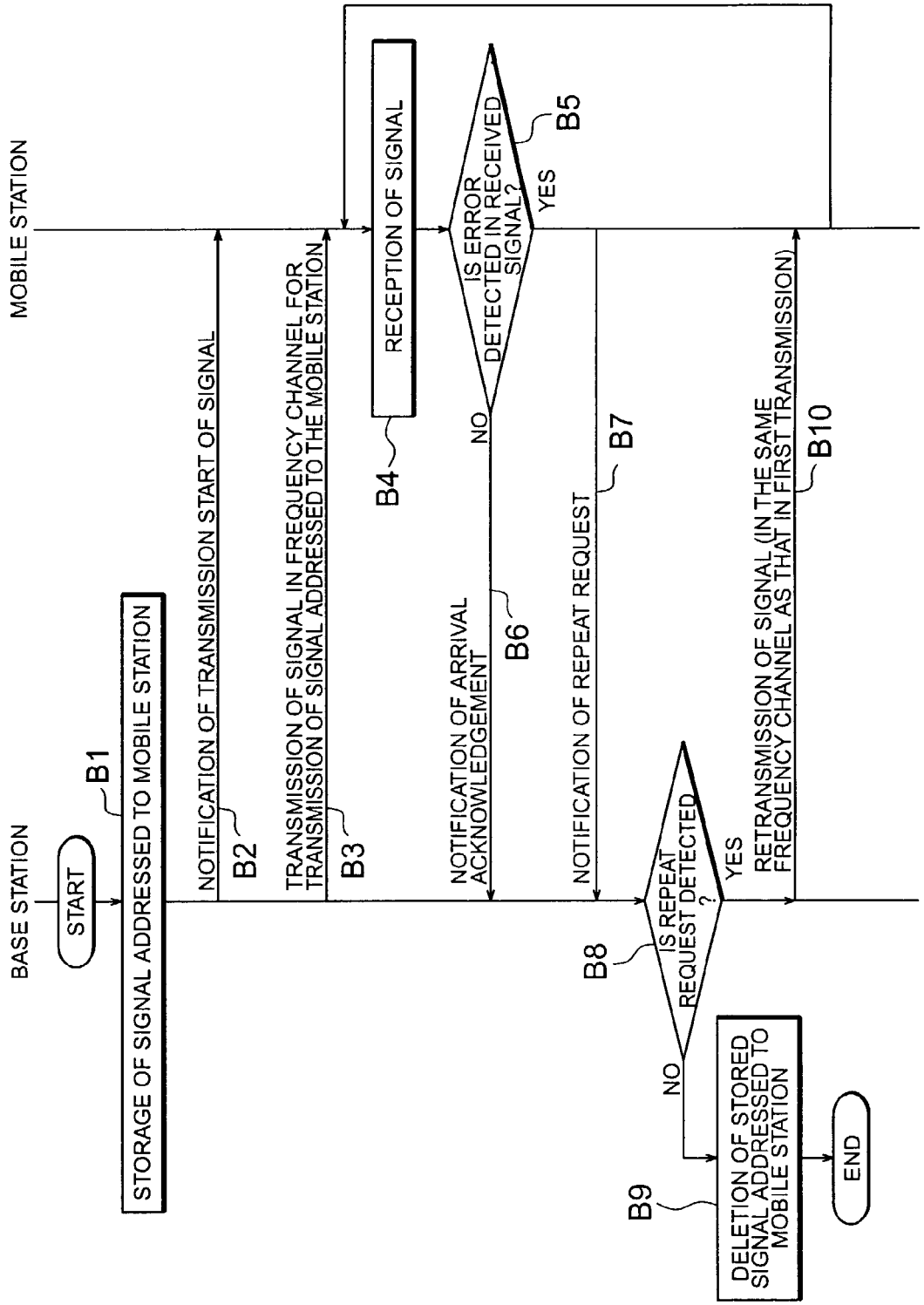
FIG. 4 is a chart for illustrating the operation of the conventional mobile communication system.
Figure 5:
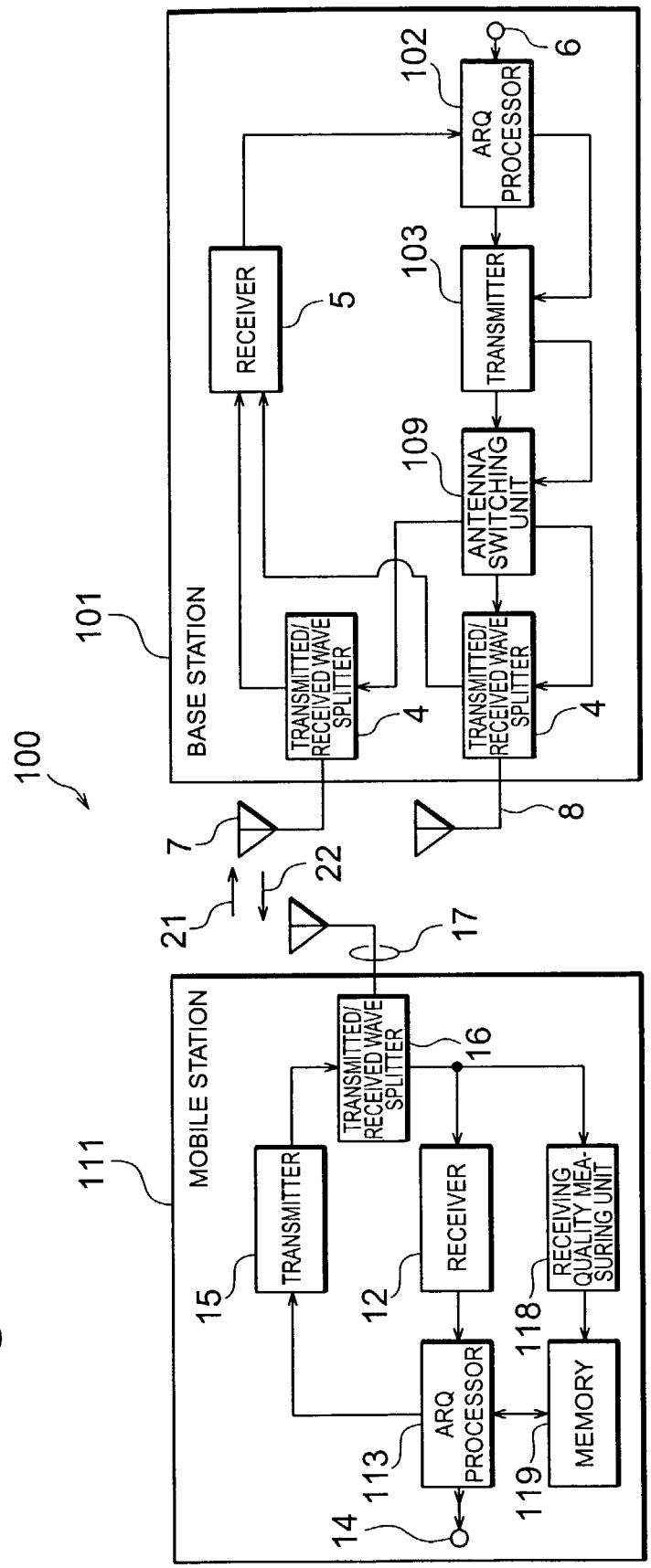
FIG. 5 is a block diagram of a mobile communication system in the first embodiment of the present invention.

The first embodiment of the present invention will be described with reference to FIGS. 5 to 7. The present embodiment will describe an example in which a base station is equipped with two base station antennas, but it is noted that the present invention can be substantiated with any number of base station antennas.

First, the configuration of the mobile communication system will be generally described. As shown in FIG. 5, the mobile communication system 100 is generally comprised of a base station 101 and a mobile station 111.

The base station 101 comprises a plurality of base station antennas 7, 8; a plurality of transmitted/received wave splitters 4 provided corresponding to the respective antennas; an antenna switching unit 109 for switching the transmitted/received wave splitters 4 one from another to use either one; an ARQ processor 102 configured to perform various processes including a process of attaching the error-detectable parity such as the CRC or the like to the input data entering a data input terminal 6, a process of retransmitting a signal in response to a repeat request from the mobile station, a process of notifying a transmitter 103 of use of an antenna based on an antenna use request, and so on; the transmitter 103 configured to switch output of the antenna switching unit 109 and transmit data from the ARQ processor 102; and a receiver 5 configured to receive data from the outside through the base station antennas 7, 8 and feed the data to the ARQ processor 102.

The mobile station 111 comprises a mobile station antenna 17; a transmitted/received wave splitter 16; a receiving quality measuring unit 118 configured to measure a receiving quality of a received signal for measurement of receiving quality and store the receiving quality in a memory 119; a receiver 12 configured to receive a signal from the outside through the transmitted/received wave splitter 16; an ARQ processor 113 configured to perform the error detection using the CRC for the signal received at the receiver 12 and output data from a data output terminal 14 and also configured to, with detection of an error, output to a transmitter 15 notification of a repeat request for retransmission of received data and a number of a base station antenna with a high receiving quality; and a transmitter 15 configured to transmit the notification of the repeat request and the number of the base station antenna with the high receiving quality from the ARQ processor 13.

The present embodiment will be described hereinafter, supposing the receiving quality is a received power. However, as explicitly stated in claim 10, it is also possible to employ as the receiving quality a value obtained by dividing a carrier power by the sum of an interference power and a noise power (i.e., C/(I+N)), a value obtained by dividing a signal power by the sum of an interference power and a noise power (i.e., S/(I+N)), an error rate, a likelihood obtained in decoding of error correction code, a C/N ratio, an S/N ratio, a correlation value obtained by despreading of spreading code, or a combination of two or more out of these.

Figure 6:
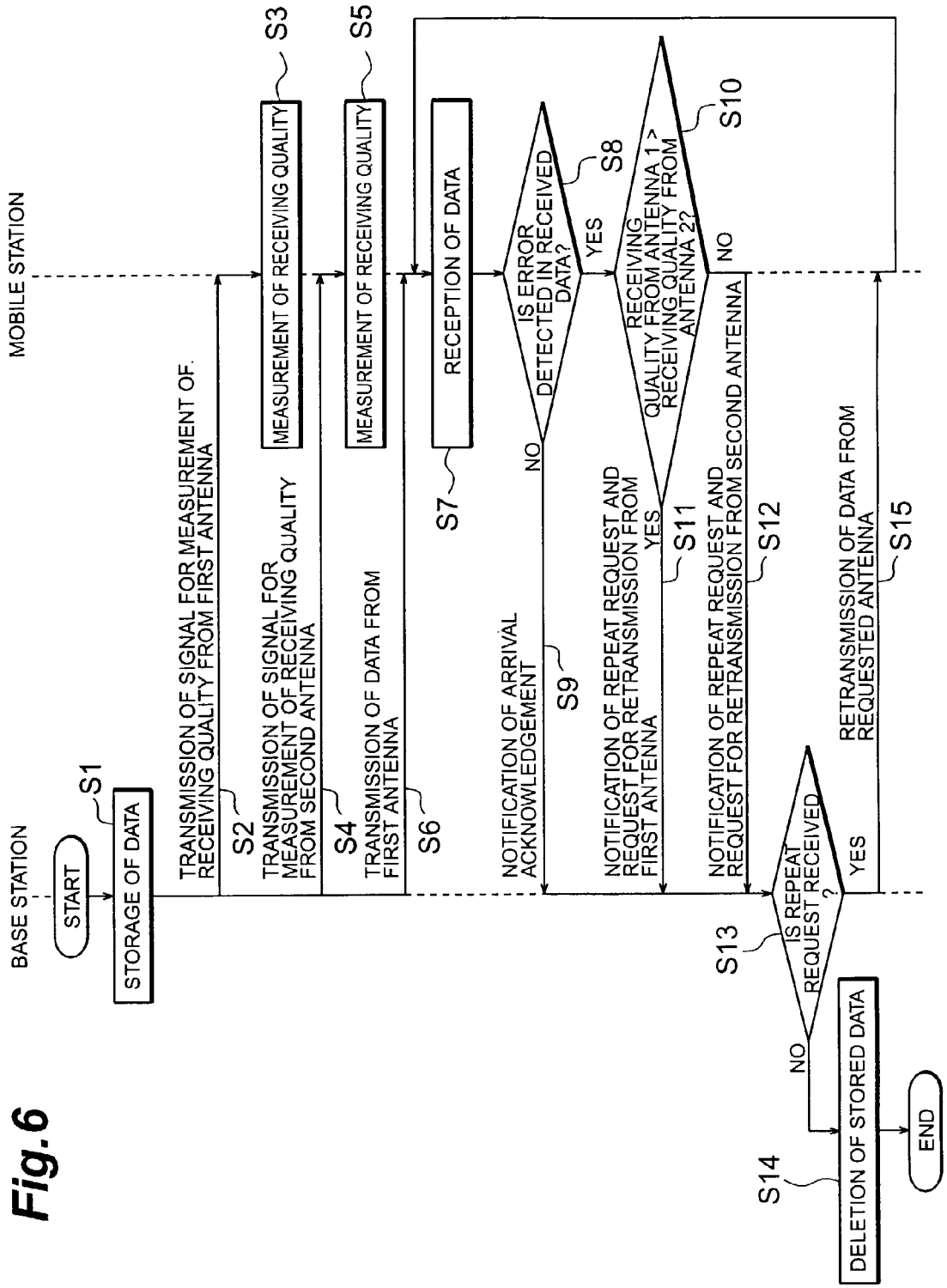
FIG. 6 is a chart for illustrating the cooperative operation of the mobile communication system with the automatic repeat request in the first embodiment of the present invention.

The following will describe the operation of the mobile communication system along FIG. 6.

At the base station 101, data addressed to the mobile station 111, entering the data input terminal 6, is fed into the ARQ processor 102. The ARQ processor 102 attaches the error-detectable parity such as the CRC or the like to the data so as to permit detection of an error occurring during transmission, thereafter stores the data, and outputs the data to the transmitter 103 (step 1).

Prior to transmission of a transmitted signal of the input data, the transmitter 103 switches the output of the antenna switching unit 109 to the first base station antenna and outputs a signal for measurement of receiving quality therefrom. The signal for measurement of receiving quality is transmitted through the transmitted/received wave splitter 4 and from the first base station antenna 7 to the mobile station 111 (step 2).

At the mobile station 111, the signal for measurement of receiving quality is fed through the transmitted/received wave splitter 16 into the receiving quality measuring unit 118. The receiving quality measuring unit 118 measures a received power value of the signal for measurement of receiving quality and stores the received power value as a receiving quality with the use of the first base station antenna in the memory 119 (step 3).

Next, the output of the antenna switching unit 109 is switched to the second base station antenna and a signal for measurement of receiving quality is outputted. The signal for measurement of receiving quality is transmitted through the transmitted/received wave splitter 4 and from the second base station antenna 8 to the mobile station 111 (step 4).

At the mobile station 111, in much the same manner as above, the signal for measurement of receiving quality is fed through the transmitted/received wave splitter 16 into the receiving quality measuring unit 118 to measure a received power value thereof, and the received power value is stored as a receiving quality with the use of the second base station antenna in the memory 119 (step 5).

Figure 7A:
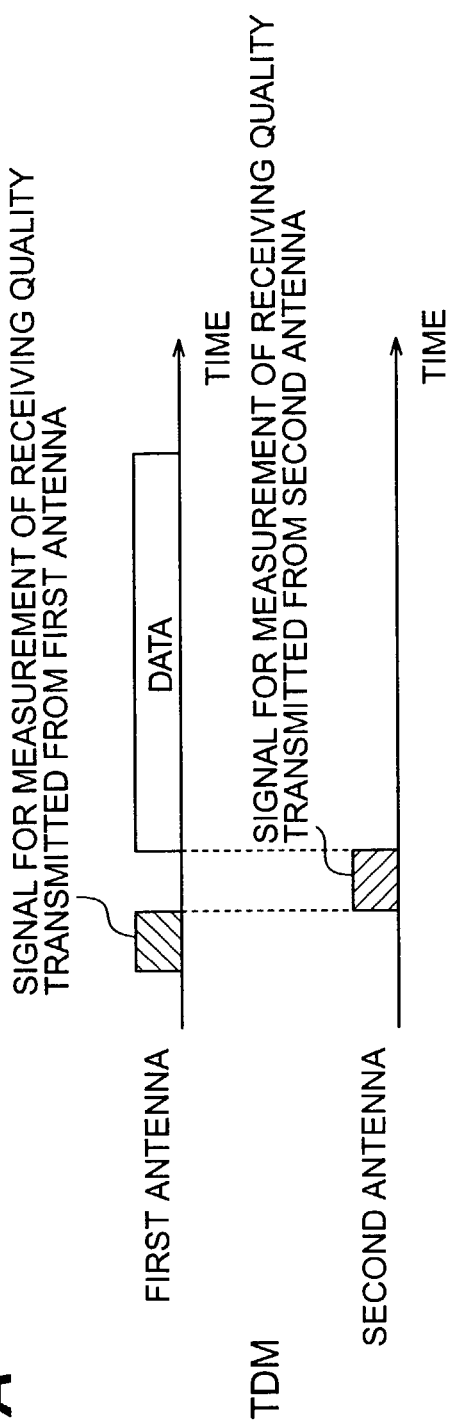
FIG. 7A is a diagram for illustrating the procedure of data transmission in application of the TDM system, and FIG. 7B a diagram for illustrating the procedure of data transmission in application of the CDM system.

Thereafter, as shown in FIG. 7A, the output of the antenna switching unit 109 is switched to the first base station antenna 7 and the transmitted signal of the data is outputted. The transmitted signal is transmitted through the transmitted/received wave splitter 4 and from the first base station antenna 7 to the mobile station 111 (step 6).

Figure 7B:
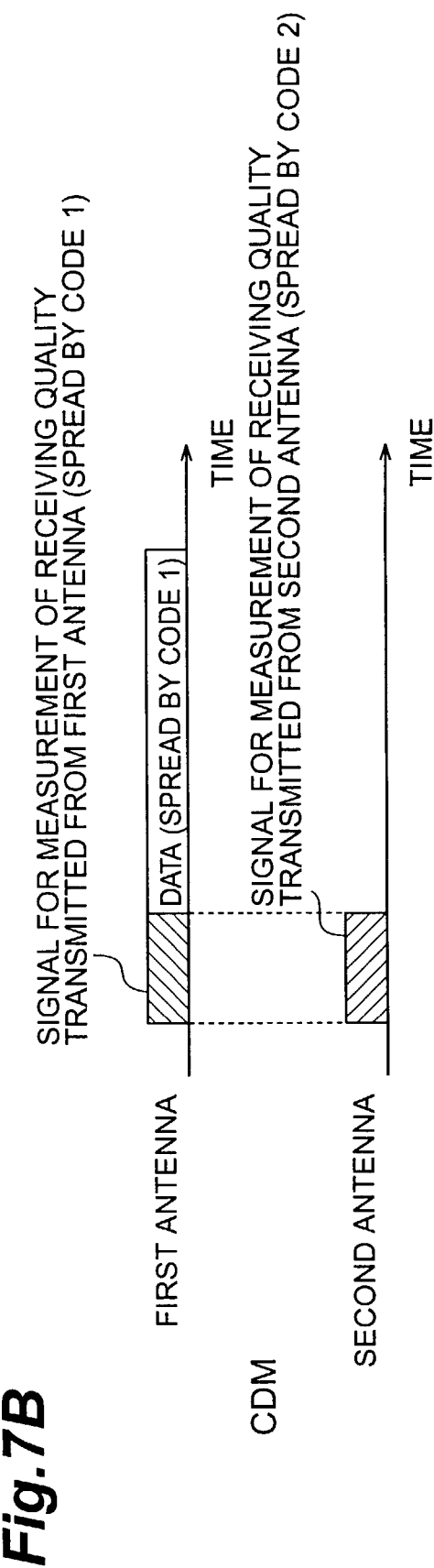

The above described an application of the TDM (Time Division Multiple) system, but it is also possible to apply the CDM (Code Division Multiple) system. In this system, as shown in FIG. 7B, signals for measurement of receiving quality are spread by spreading codes uniquely corresponding to the respective antennas and thereafter the signals are transmitted from the corresponding antennas. The mobile station receives the signals, despreads the signals by the spreading codes uniquely corresponding to the antennas to obtain received powers, correlation values, or the like, and can use them as receiving qualities.

The following will continue the description back into the application case of the TDM system.

At the mobile station 111, the received signal is fed through the transmitted/received wave splitter 16 into the receiver 12. Then the signal received at the receiver 12 is fed as received data into the ARQ processor 113 (step 7). Then the ARQ processor 113 performs the error detection using the CRC. When no error is detected in the received data herein, the received data is outputted from the data output terminal 14 and an acknowledgement of arrival of the data is sent through an uplink 21 to the ARQ processor 102 of the base station 101 (step 8 and step 9).

The base station 101 can be configured to, on the occasion of receiving notification of an arrival acknowledgement or a repeat request from the mobile station 111, feed the outputs from the first base station antenna 7 and the second base station antenna 8 into the receiver 5 and perform antenna reception in the diversity system of two branches, thereby improving the receiving quality of the uplink. Then the ARQ processor 102, receiving the notification of the arrival acknowledgement, deletes the data stored for retransmission (step 13 and step 14).

When at step 8 an error is detected in the received data on the other hand, the ARQ processor 113 searches for a number of a base station antenna with the higher receiving quality, i.e., the higher received power value stored in the memory 119, and outputs the number of the base station antenna together with a repeat request for retransmission of the received data to the transmitter 15. The transmitter 15 sends the repeat request of the received data and the number of the base station antenna through the uplink 21 to the ARQ processor 102 of the base station 101 (step 10, step 11, and step 12). The ARQ processor 102, receiving the notification of the repeat request, first notifies the transmitter 103 of the antenna number requested by the mobile station 111, and the transmitter 103 controls the antenna switching unit 109 so as to be ready for transmission through the use of the antenna to the mobile station 111. Then the data under the repeat request is retransmitted from the antenna requested by the mobile station 111 (step 13 and step 15).

Since the ARQ processor 102 stores the number of the antenna requested by the mobile station 111, it becomes feasible to transmit new data addressed to the mobile station 111, entering the data input terminal 6 thereafter, through the use of the base station antenna with the higher receiving quality at the mobile station 111, without the need for transmitting the aforementioned signals for measurement of receiving quality from the base station 101.

According to the first embodiment as described above, the signal addressed to the mobile station 111 is transmitted from the base station 101 through the use of the antenna with the receiving quality relatively better, based on the receiving qualities of the signals measured at the mobile station 111, and it is thus feasible to improve the receiving quality of the signal at the mobile station 111, to prevent the repetition of repeat requests from the mobile station 111, and to enhance the throughput of the mobile communication system 100.

The above described the transmission of the signals for measurement of receiving quality prior to the transmission of data, but the present invention can also be substantiated without the transmission of the signals for measurement of receiving quality prior to the data transmission, as stated in claim 9, by a configuration wherein the mobile station 111 receives a synchronization signal, a signal of annunciation information, an individual signal to the mobile station, a multicast signal, or a combination of two or more out of these and always updates the contents stored in the memory 119.

The present embodiment can also be applied to the mobile station functioning as a relay station instead of the base station, supposing the situation of multihop connection. In this case, the mobile station 111, which is a transmitting station of a repeat request, preliminarily identifies existence of an adjoining mobile station as relay station and requests retransmission of a signal by designating a transmission path including the mobile station (relay station). Similarly, the base station 101, which is a transmitting station of the signal according to the repeat request, preliminarily identifies existence of an adjoining mobile station as a relay station and responds to the repeat request by designating a transmission path including the mobile station (relay station).

Second Embodiment

The configuration of the second embodiment of the present invention will be described with reference to FIG. 8.

The present embodiment will describe an example of multicast transmission wherein the base station transmits identical data (which will be referred to as multicast data in the present embodiment) to a plurality of mobile stations and a configuration wherein an automatic repeat request is arranged so that notification of a repeat request is given only when an error is detected. There exist a plurality of mobile stations receiving the multicast data, but the following will describe the operation of only one mobile station out of them. It is a matter of course that like operation is carried out at the other mobile stations being multicast targets omitted to describe.

At the base station 201, multicast data addressed to the mobile stations 211, entering the data input terminal 6, is fed into the ARQ processor 202. The ARQ processor 202 stores the multicast data for retransmission in the memory 210, thereafter attaches the CRC to the data and performs error-correction code coding thereof, and further attaches information about a number of a base station antenna used for transmission and then outputs the data to the transmitter 3. Then the transmitter 3 controls the antenna switching unit 109 so as to implement transmission from the antenna indicated by the information on the number of the base station antenna thus attached. The transmitter 3 modulates the input multicast data into a transmitted signal (multicast signal) and thereafter outputs the signal to the antenna switching unit 109. The antenna switching unit 109 is configured to be able to transmit the multicast signal through the transmitted/received wave splitter 4 and from the base station antenna corresponding to the aforementioned number information (either the first base station antenna 7 or the second base station antenna 8).

In the present embodiment, it is assumed that the antenna switching unit 109 is controlled so as to be able to transmit the multicast signal, preferentially using a base station antenna with the greatest number of requests from the mobile stations being the multicast targets. Namely, before outputting the multicast data to the transmitter 3, the ARQ processor 202 searches the information stored in the memory 210 for the information on the number of the base station antenna with the greatest number of requests from the mobile stations, and controls the antenna switching unit 109 so as to transmit the multicast signal from the base station antenna corresponding to the number. The memory 210 is used for storing correspondences between the numbers of requests from the mobile stations and the numbers of the base station antennas.

At the mobile station 211 on the other hand, the multicast signal received at the mobile station antenna 17 through the downlink 22 is fed through the transmitted/received wave splitter 16 into the receiver 12. The receiver 12 demodulates the received multicast signal and outputs the demodulated signal as received multicast data to the ARQ processor 213. The ARQ processor 213 performs the decoding of error correction code and thereafter performs the error detection using the attached CRC. At the same time, the ARQ processor 213 stores a likelihood obtained in the decoding of error correction code, together with the information on the number of the base station antenna attached to the received multicast data, in the memory 119. The foregoing likelihood can be the number of corrected bits in the case of the error-correction code coding being the block code such as the BCH code, the RS code, or the like, or a metric in the case of the convolutional code.

When the foregoing error detection with the CRC finds no error in the received multicast data, the ARQ processor 213 outputs the received multicast data from the data output terminal 14, without transmitting any signal to the base station 201 at all. When an error is detected in the received multicast data on the other hand, the ARQ processor 213 searches the information stored in the memory 119 for the information on the number of the base station antenna with the highest receiving quality and outputs the information on the number of the base station antenna together with a repeat request for retransmission of the received multicast data to the transmitter 15. The transmitter 15 transmits the repeat request of the received multicast data and the information on the number of the base station antenna through the uplink 21 to the base station 201.

At the base station 201, the receiver 5 receives the repeat request of the received multicast data and the information on the number of the base station antenna and the receiver 5 outputs the data to the ARQ processor 202. The ARQ processor 202, as described previously, measures the number of requests for the numbers of the base station antennas requested by the mobile stations, stores the correspondences between the numbers of the base station antennas and the numbers of mobile stations requesting the respective antennas, in the memory 210, and, on the occasion of retransmitting the multicast data thereafter, retransmits the data, preferentially using the base station antenna with the greatest number of requests.

Figure 9:
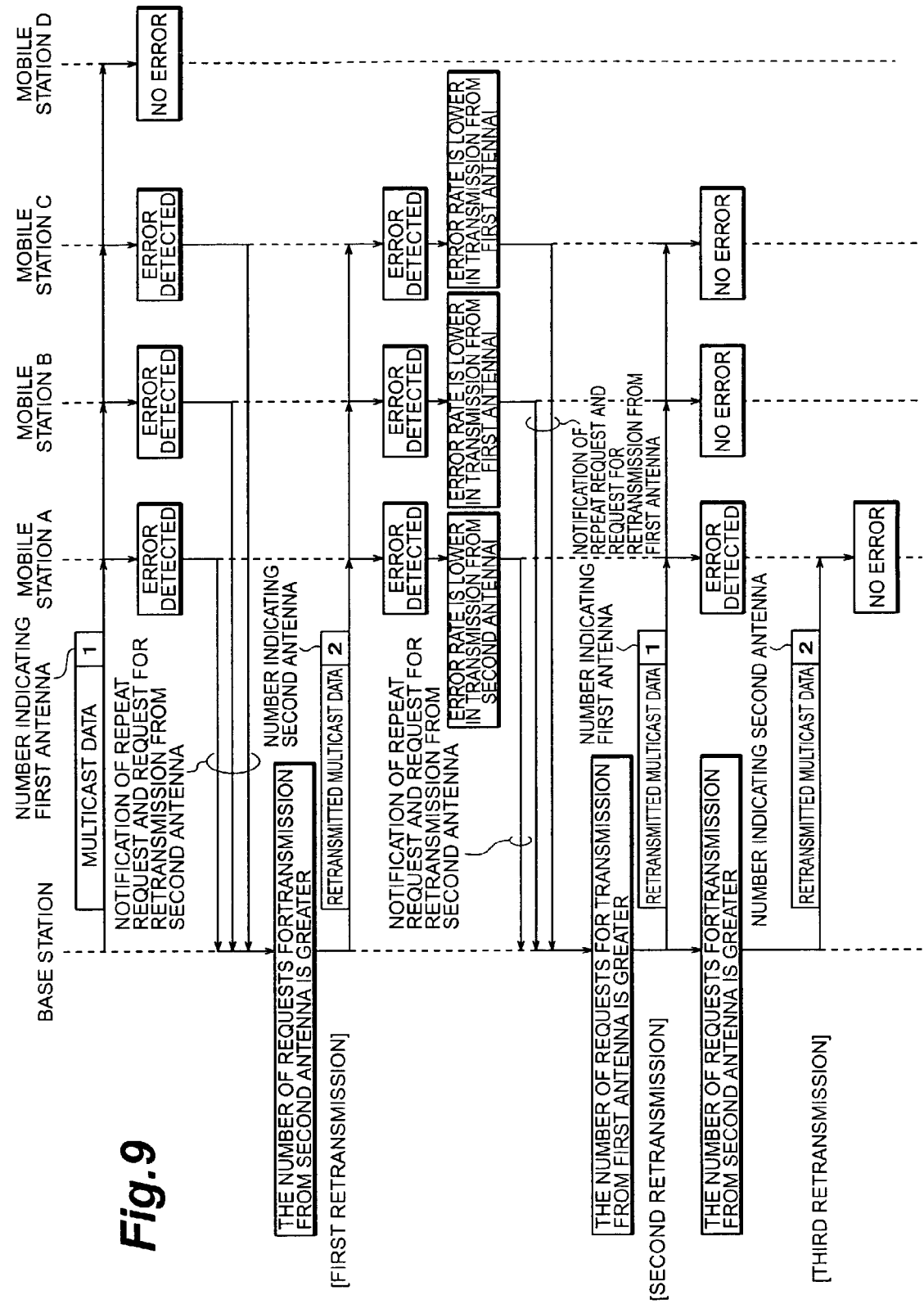
FIG. 9 is a chart for illustrating the cooperative operation of the mobile communication system with the automatic repeat request in the second embodiment of the present invention.

The following will describe the cooperative operation of the base station 201 and a plurality of mobile stations (four mobile stations A to D as an example herein) with reference to FIG. 9. The configuration of the mobile stations A to D is substantially the same as that of the mobile station 211 shown in FIG. 8, and they are in an initial state in which no data is stored yet in the memory 210 provided in the base station 201 and in the memories 119 provided in the respective mobile stations.

The base station 201 attaches the number information of the first antenna 7 to multicast data, and transmits the multicast data with the number information thus attached, to all the mobile stations (the mobile stations A to D) as multicast targets. For example, let us suppose the mobile stations A to C detect an error in the received multicast data. Then the mobile stations A to C send to the base station 201 a repeat request for retransmission of the data and an antenna use request that the second antenna 8, an error rate of which is not stored yet in the memory 119, should be used. Since the mobile station D detects no error in the received multicast data, it transmits nothing to the base station 201.

At the base station 201, the ARQ processor 202 then measures the number of requests for the information on the number of each antenna to be used for retransmission, from the mobile stations A to C, and stores the results of the measurement, i.e., information indicating that the number of requests for retransmission from the second antenna 8 is three and that the number of requests for retransmission from the first antenna 7 is zero, in the memory 210. For this reason, based on the foregoing results of the measurement stored in the memory 210, the base station 201 transmits the multicast data to be retransmitted (hereinafter referred to as retransmitted multicast data) to the mobile stations A to C from the second antenna 8 with the maximum number of requests for retransmission (this step corresponds to "first retransmission" in FIG. 9).

In the reception of the first retransmitted multicast data, the mobile stations A to C again detect an error, and then send a repeat request to the base station 201. At the mobile station A, an error rate is lower in the reception of the multicast data transmitted from the second antenna 8, and the mobile station A sends a use request for use of the second antenna 8, together with the notification of the repeat request, to the base station 201. On the other hand, at the mobile stations B and C, an error rate is lower in the reception of the multicast data transmitted from the first antenna 7, and thus they send a use request for use of the first antenna 7, together with the notification of the repeat request, to the base station 201.

At the base station 201, the ARQ processor 202 stores information that the number of requests for retransmission from the second antenna 8 is one and the number of requests for retransmission from the first antenna 7 is two, in the memory 210. For this reason, based on the results of the above measurement stored in the memory 210, the base station 201 transmits the retransmitted multicast data to the mobile stations A to C from the first antenna 7 with the maximum number of requests for retransmission (this step corresponds to "second retransmission" in FIG. 9).

The mobile stations B and C detect no error in the reception of the second retransmitted multicast data, and thus they transmit nothing to the base station 201. On the other hand, the mobile station A detects an error, but it sends no repeat request to the base station 201, because the base station antenna used for the transmission is not the antenna requested by the mobile station A. This is because in the next transmission the retransmitted multicast data is expected to be transmitted using the second antenna 8 requested by the mobile station A.

Thereafter, based on the results of the measurement stored in the memory 210, the base station 201 transmits the retransmitted multicast data to the mobile station A from the second antenna 8 with the second highest number of requests for retransmission (this step corresponds to "third retransmission" in FIG. 9).

The mobile station A detects no error in the reception of the third retransmitted multicast data, and thus transmits nothing to the base station 201, thus completing the multicast transmission from the base station 201.

By the operation as described above, it becomes feasible to implement the transmission of high-quality signals with the automatic repeat request of the present invention in the transmission of multicast data.

According to the second embodiment described above, the base station 201 transmits the retransmitted multicast data, using the base station antennas in descending order of the number of antenna use requests based on the receiving qualities of signals measured at the respective mobile stations, and it is thus feasible as a whole of the mobile communication system to improve the receiving qualities of retransmitted multicast data at more mobile stations, to decrease the total number of occurrences of repeat requests, and to enhance the total throughput of the entire system.

The above first and second embodiments described the examples in which the mobile station transmitted the antenna use request for use of one antenna out of the plurality of base station antennas, but it is also possible in the case of a number of base station antennas being provided, to employ a configuration wherein the mobile station transmits an antenna use request designating two or more base station antennas with better receiving qualities, as antennas to be used.

Incidentally, while the present invention can be mentioned as a so-called diversity system wherein one base station uses plural antennas, site diversity is known as a diversity system wherein a plurality of base stations use one antenna.

This site diversity has the advantage of great diversity gain because of no correlation with shadowing (variation of local median value), but it has the following disadvantages against the fading (instantaneous variation), though demonstrating some great diversity gain because of no correlation therewith: the delay in control time is too large to realize the satisfactory diversity gain because of transmission of control signals between plural base stations; the efficiency is low, because radio resources and devices for the plural base stations are preliminarily occupied for the control in order to adapt to the instantaneous variation.

When the present invention is applied in combination with the above site diversity, it can provide the effect of increase in the diversity gain thanks to the use of the plural base stations against the shadowing. Since the control time can be unlimitedly shortened by the feature of the present invention of using plural antennas in one base station, satisfactorily large diversity gain can be realized against the fading. By applying the site diversity to the present invention as described, it is feasible to attain the maximum diversity gain.

The present embodiment can also be applied to the mobile station functioning as a relay station instead of the base station, supposing the situation of multihop connection. In this case, the mobile station 211, which is a transmitting station of a repeat request, preliminarily identifies existence of an adjoining mobile station as relay station and requests retransmission of a signal by designating a transmission path including the mobile station (relay station). Similarly, the base station 201, which is a transmitting station of the signal according to the repeat request, preliminarily identifies existence of an adjoining mobile station as a relay station and responds to the repeat request by designating a transmission path including the mobile station (relay station).

Third Embodiment

The third embodiment of the present invention will be described with reference to FIGS. 10 and 11. The present embodiment will describe an example in which the base station transmits the signal to the mobile station in the multiband transmission system.

Figure 10:
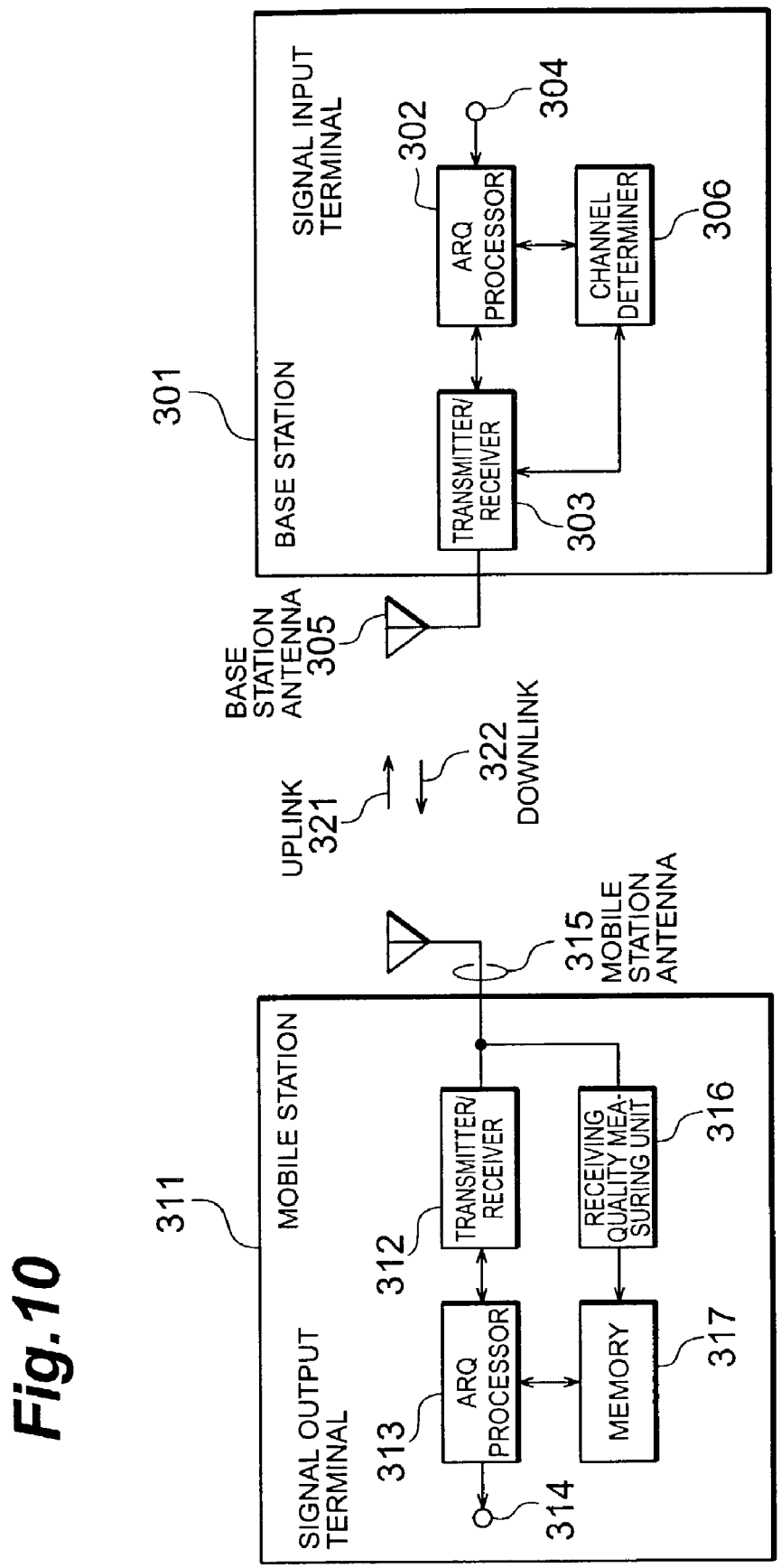
FIG. 10 is a block diagram of a mobile communication system in the third embodiment to which the signal transmitting method of the present invention is applied.

FIG. 10 is a block diagram of the mobile communication system in the present embodiment, which is generally comprised of a base station 301 and a mobile station 311. The base station 301 comprises an ARQ processor 302, a transmitter/receiver 303, a signal input terminal 304, a base station antenna 305, and a channel determiner 306. The mobile station 311 comprises a transmitter/receiver 312, an ARQ processor 313, a signal output terminal 314, a mobile station antenna 315, a receiving quality measuring unit 316, and a memory 317.

Figure 11:
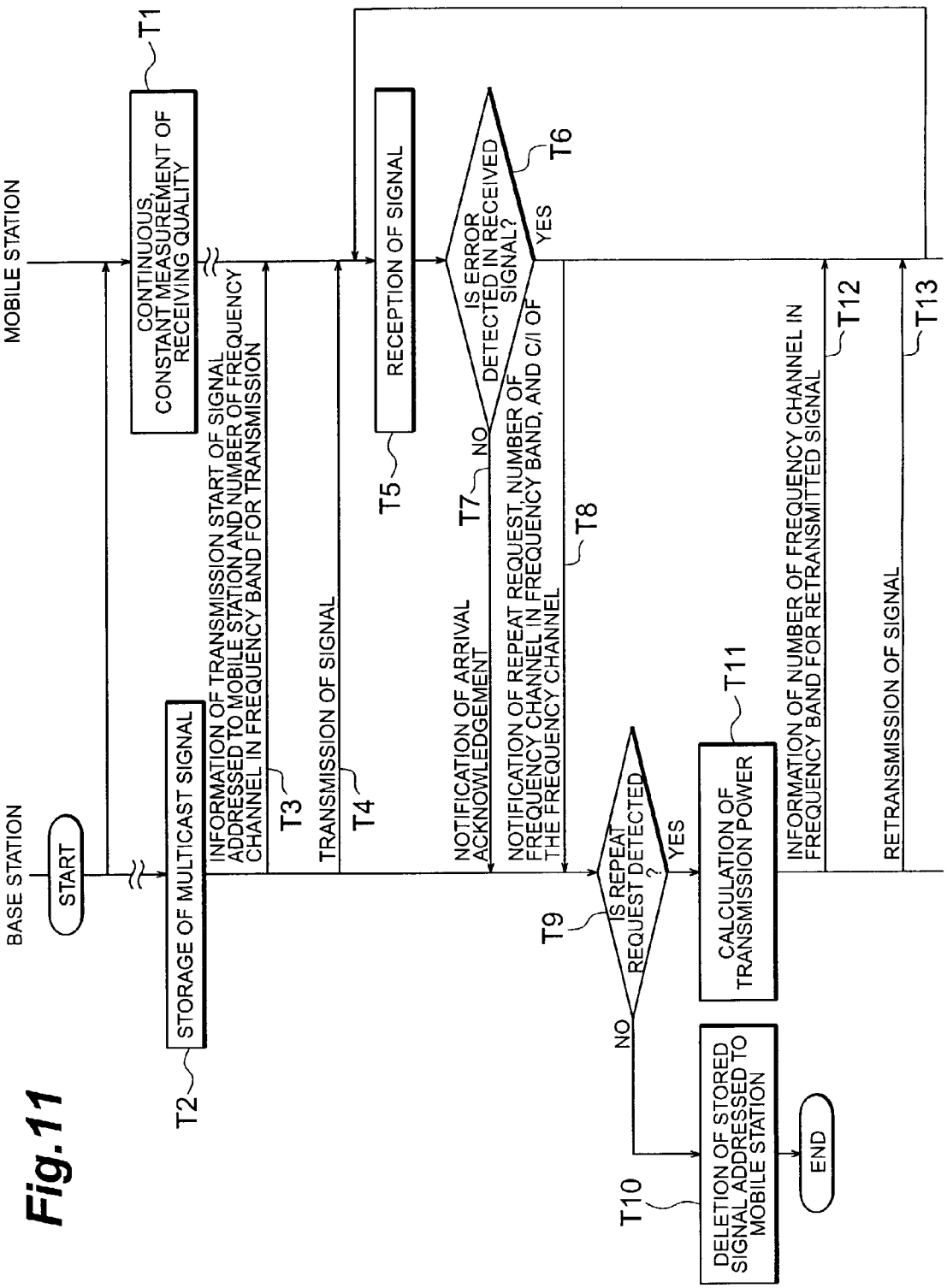
FIG. 11 is a flowchart showing the operation in the third embodiment of the present invention.

The following will describe the operation with reference to the flowchart of FIG. 11.

At the base station 301, a signal addressed to the mobile station 311, entering the signal input terminal 304, is fed into the ARQ processor 302. The ARQ processor 302 attaches the error-detectable parity such as the CRC or the like to the signal so as to permit the detection of an error occurring during transmission, thereafter stores the signal for retransmission (T2), and outputs the signal to the transmitter/receiver 303. The transmitter/receiver 303 informs the mobile station 311 of a transmission start of the signal addressed to the mobile station 311 and a number of a frequency channel in a frequency band for transmission of the signal (T3) and thereafter transmits the signal to the mobile station 311 (T4).

If candidates are preliminarily known for the number of the frequency channel in the frequency band for transmission of the signal, it is also possible to omit the informing step of the number of the frequency channel in the frequency band.

On the other hand, at the mobile station 311, the receiving quality measuring unit 316 continuously, constantly measures C/I (Carrier-to-Interfere ratio: carrier power to interference power ratio) of individual channels transmitted from the base station 301, as receiving qualities (T1), and stores relations between numbers of frequency channels in frequency bands measured, and C/I's of the frequency channels in the memory 317.

As described above, the receiving quality measuring unit 316 continuously, constantly measures the C/I's of individual channels or the like transmitted from the base station 301. Therefore, the relations are always updated between numbers of frequency channels in frequency bands, and C/I's of the frequency channels in the memory 317.

At the mobile station 311 in this configuration, the signal addressed to the mobile station, transmitted from the base station 301, is received through the downlink 322 by the transmitter/receiver 312 (T5), and thereafter the signal is fed into the ARQ processor 313. The ARQ processor 313 performs the error detection of the received signal using the CRC. When no error is detected in the received signal (NO at T6), the ARQ processor 313 outputs the received signal from the signal output terminal 314 and also sends an acknowledgement of arrival of the received signal through the uplink 321 to the ARQ processor 302 of the base station 301 (T7). Then the ARQ processor 302, receiving the notification of the arrival acknowledgement from each mobile station, deletes the signal addressed to the mobile station, stored for retransmission (T9 and T10). In this respect, it is also possible to employ a configuration without the notification of the arrival acknowledgement (T7), wherein the process of detecting the repeat request (T9) is provided with a time-out judging function and the operation of T10 is carried out when no repeat request is detected within a certain period of time.

When at T6 an error is detected in the received signal (YES at T6) on the other hand, the ARQ processor 313 sends a repeat request for retransmission of the received signal through the uplink 321 to the ARQ processor 302 of the base station 301 and also sends to the channel determiner 306 of the base station 301 a number of a frequency channel in a frequency band with the maximum C/I out of those measured and stored in the memory 317, and the C/I of the frequency channel (T8).

When the ARQ processor 302 receives the repeat request, it is determined at T9 whether the input signal is a repeat request. When a repeat request is detected at the determination of T9 (YES at T9), the channel determiner 306 is notified of the result of the detection. Receiving the notification of the detection of the repeat request from the ARQ processor 302, the channel determiner 306 calculates such a transmission power that the receiving quality at the mobile station 311 becomes a required value, based on the C/I thus notified of (T11), and then controls the transmitter/receiver 303 so that the signal under the repeat request is retransmitted by the frequency channel number notified of and the transmission power calculated. Then the signal retransmitted from the ARQ processor 302 is fed into the transmitter/receiver 303, and the transmitter/receiver 303 informs the mobile station of the number of the frequency channel in the frequency band used for retransmission (T12) and thereafter transmits the retransmitted signal thereto (T13).

The base station 301 also transmits a new signal addressed to the mobile station, entering the signal input terminal 304 thereafter, by using the number of the frequency channel in the frequency band and the transmission power acquired in the above operation.

When candidates are known in advance for the number of the frequency channel in the frequency band used for retransmission, the base station omits the informing step of the number of the frequency channel in the frequency band used for retransmission and the mobile station receives the retransmitted signal by the use of the number of the frequency channel in the frequency band with the maximum receiving quality out of the candidates for the number of the frequency channel in the frequency band.

As described above, the present embodiment showed the example using the multiband transmission system as an example of the transmission system between the base station 301 and the mobile station 311, and besides, it is also possible to use the FDM (Frequency Division Multiplexing) transmission system, the multicarrier transmission system, or the OFDM (Orthogonal Frequency Division Multiplexing) transmission system as a transmission system between the base station 301 and the mobile station 311. For example, the base station 301 is notified of a number of a frequency channel and a receiving quality of the frequency channel in the case of the FDM transmission system being used; of a number of a subcarrier channel and a receiving quality of the subcarrier channel in the case of the multicarrier transmission system being used; or of a number of an orthogonal subcarrier channel and a receiving quality of the orthogonal subcarrier channel in the case of the OFDM transmission system being used, whereby the receiving quality at the mobile station 311 can be improved by the operation similar to that in the present embodiment.

According to the third embodiment of the present invention, as described above, the base station 301 calculates the transmission power to achieve the required receiving quality at the mobile station, based on the number of the frequency channel and the C/I of the frequency channel notified of by the mobile station 311, and retransmits the signal under the repeat request from the mobile station 311, using the number of the frequency channel notified of and the transmission power thus calculated, whereby the mobile station 311 can be prevented from being kept in the low receiving quality state because of fading or shadowing. As a consequence, the repetition of repeat requests from the mobile station 311 can be reduced, so as to enhance the throughput. Since the retransmission of the retransmitted signal is carried out after changeover into the frequency channel with the minimum transmission power from the base station 301, interference can be reduced with mobile stations 311 not receiving the retransmitted signal.

The present embodiment can also be applied to the mobile station functioning as a relay station instead of the base station, supposing the situation of multihop connection. In this case, the mobile station 311, which is a transmitting station of a repeat request, preliminarily identifies existence of an adjoining mobile station as relay station and requests retransmission of a signal by designating a transmission path including the mobile station (relay station). Similarly, the base station 301, which is a transmitting station of the signal according to the repeat request, preliminarily identifies existence of an adjoining mobile station as a relay station and responds to the repeat request by designating a transmission path including the mobile station (relay station).

Fourth Embodiment

The fourth embodiment of the present invention will be described below with reference to FIGS. 12 to 15. The present embodiment will describe an example in which the base station transmits a multicast signal to each mobile station in the FDM transmission system.

Figure 12:
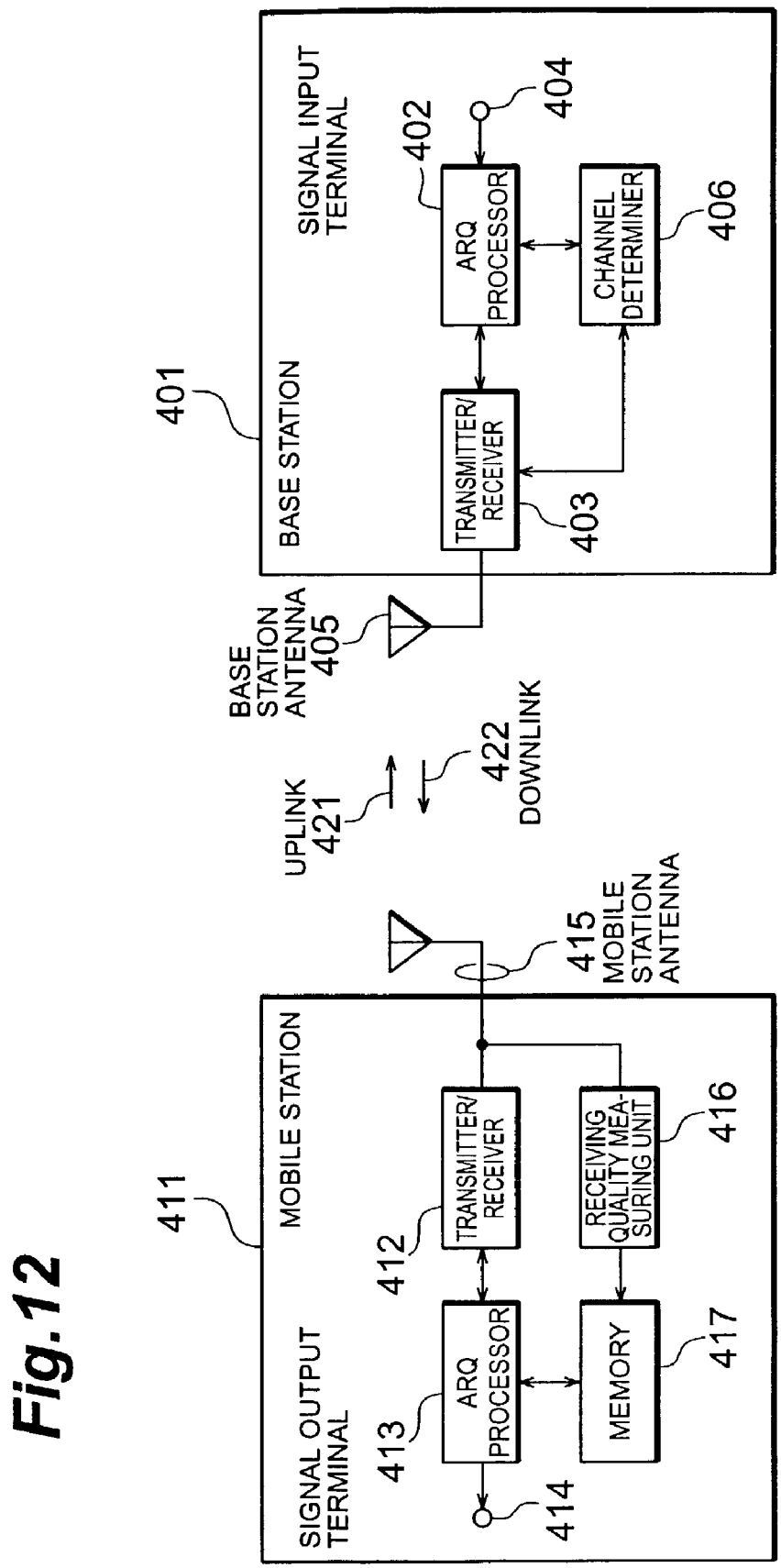
FIG. 12 is a block diagram of a mobile communication system in the fourth embodiment to which the signal transmitting method of the present invention is applied.

FIG. 12 is a block diagram of the mobile communication system in the fourth embodiment, which is generally comprised of a base station 401 and a mobile station 411, as in the third embodiment described above. The base station 401 comprises an ARQ processor 402, a transmitter/receiver 403, a signal input terminal 404, a base station antenna 405, and a channel determiner 406. The mobile station 411 comprises a transmitter/receiver 412, an ARQ processor 413, a signal output terminal 414, a mobile station antenna 415, a receiving quality measuring unit 416, and a memory 417.

Figure 13:
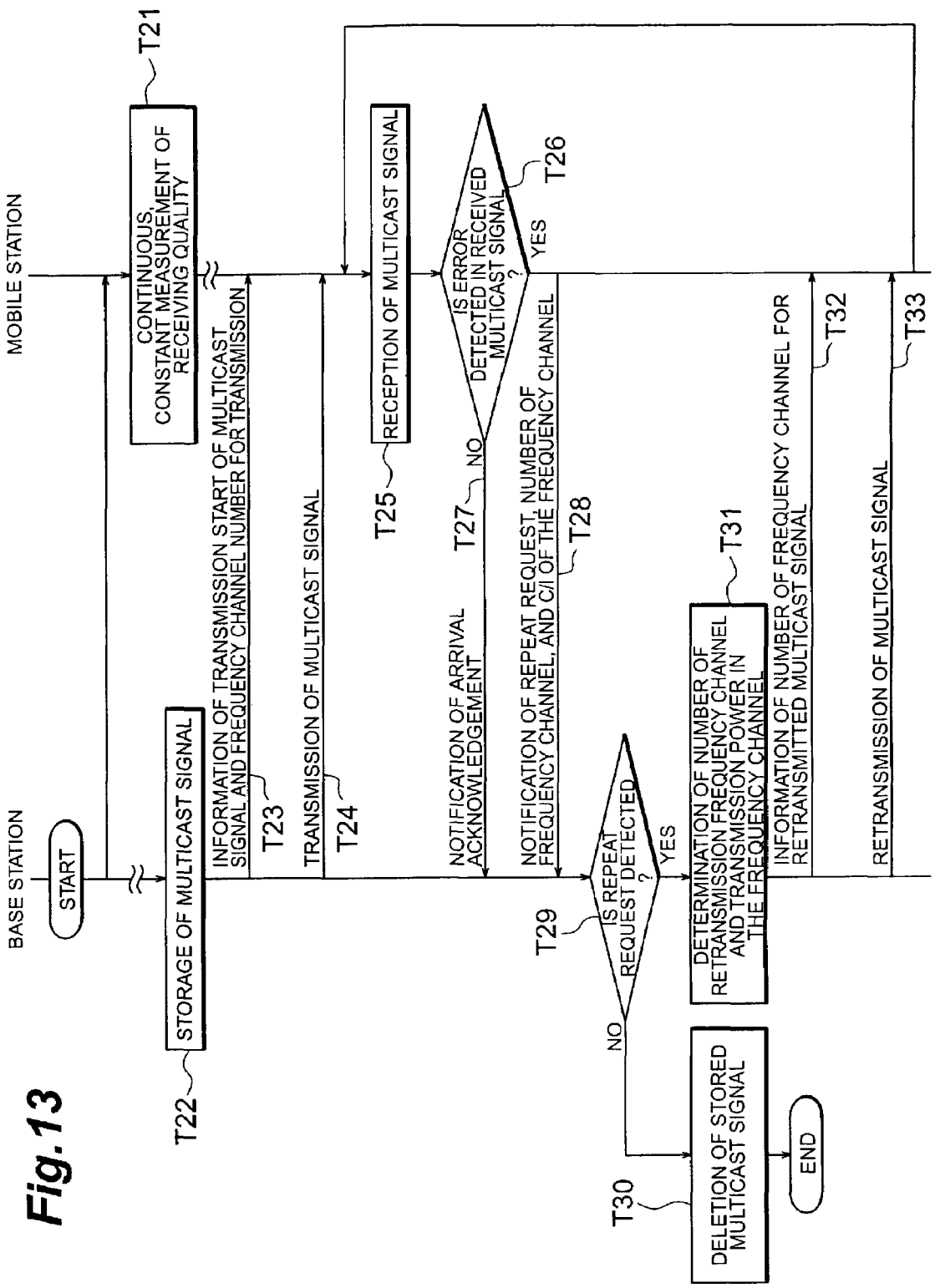
FIG. 13 is a flowchart showing the operation in the fourth embodiment of the present invention.

The following will describe the operation of the mobile communication system in the present embodiment with reference to the flowchart of FIG. 13. There exist a plurality of mobile stations in a group receiving one multicast signal, but only one mobile station in the group will be described below as a typical example. The other mobile stations belonging to the group also perform the operation similar to that of the mobile station described below.

At the base station 401, a multicast signal addressed to the mobile stations 411, entering the signal input terminal 404, is fed into the ARQ processor 402. The ARQ processor 402 attaches the error-detectable parity such as the CRC or the like to the signal so as to permit the detection of an error occurring during transmission, thereafter stores the multicast signal for retransmission (T22), and outputs the signal to the transmitter/receiver 403. The transmitter/receiver 403 informs each mobile station of a start of transmission of the multicast signal and a number of a frequency channel for transmission of the multicast signal, and thereafter transmits the multicast signal to the mobile station 411 (T23 and T24).

When candidates are known in advance for the number of the frequency channel used for transmission of the multicast signal, it is also possible to omit the informing step of the frequency channel number.

On the other hand, at the mobile station 411, the receiving quality measuring unit 116 continuously, constantly measures C/I of an individual channel or the like transmitted from the base station 401 as a receiving quality (T21), and stores the relation between the number of the frequency channel and the C/I of the frequency channel thus measured, in the memory 117.

As described above, the receiving quality measuring unit 416 continuously, constantly measures the C/I's of the individual channels or the like transmitted from the base station 401. Therefore, the relations are always updated between the numbers of the frequency channels, and the C/I's of the frequency channels in the memory 117.

The present embodiment will be described hereinafter, supposing the receiving quality is C/I. It is, however, also possible to use as the receiving quality a received power, C/(I+N), S/(I+N), C/N, S/N, an error rate, a likelihood obtained in decoding of error correction code, a base station transmission power value, an amount of increase or attenuation of the base station transmission power, or a combination of these. The character "C" in C/(I+N) above represents the carrier power, and "S" in S/(I+N) above the signal power. Further, the character "I" in above C/(I+N) and above S/(I+N) represents the interference power, and "N" the noise power.

In the present invention, as described, it is possible to use any signal for the measurement of receiving quality as long as it is a signal transmitted from the base station 401 configured to transmit the multicast signal.

At the mobile station 411, the multicast signal transmitted from the base station 401 is received through the downlink 422 at the transmitter/receiver 412 (T25) and thereafter is fed into the ARQ processor 413. The ARQ processor 413 performs the error detection of the received multicast signal using the CRC. When no error is detected in the received multicast signal (NO at T26), the ARQ processor 413 outputs the received multicast signal from the signal output terminal 414 and sends an acknowledgement of arrival of the received multicast signal to the ARQ processor 402 of the base station 401 through the uplink 421 (T27).

The ARQ processor 402, receiving only the notification of the arrival acknowledgement from each mobile station, deletes the multicast signal stored for retransmission (NO at T29, and T30). In this respect, it is also possible to employ a configuration without the foregoing notification of the arrival acknowledgement (T27), wherein the process of detecting the repeat request (T29) is provided with a time-out judging function and the operation of (T30) is executed when no repeat request is detected within a certain period of time.

When an error is detected in the received multicast signal on the other hand (YES at T26), the ARQ processor 413 sends a repeat request for retransmission of the received multicast signal through the uplink 421 to the ARQ processor 402 of the base station 401. The ARQ processor 413 also makes access to the memory 417 and notifies the channel determiner 406 of the base station 401, of the latest frequency channel number and the C/I of the frequency channel measured and stored in the memory 417 (T28).

When the repeat request is fed into the ARQ processor 402, it is determined at (T29) whether the input signal is a repeat request. When a repeat request is detected at the determination of T29 (YES at T29), the channel determiner 406 is notified of the result of the detection. When the channel determiner 406 receives the notification that the repeat request is detected by the ARQ processor 402, it determines a number of a frequency channel for retransmission and a transmission power of the frequency channel on the basis of the frequency channel number and the C/I of the frequency channel notified of by each mobile station (T31), and thereafter controls the transmitter/receiver 403 so as to retransmit the signal by the use of the frequency channel number and the transmission power thus determined.

Then the multicast signal stored for retransmission at the ARQ processor 402 is fed into the transmitter/receiver 403, and the transmitter/receiver 403 informs the mobile station of numbers of frequency channels or a number of a single frequency channel used for retransmission (T32) and thereafter transmits the input retransmitted multicast signal (T33).

Each mobile station to receive the retransmitted multicast signal, receives the retransmitted multicast signal in a channel of a frequency channel number with the maximum receiving quality at the mobile station out of the frequency numbers thus informed of. When candidates are known in advance for the numbers of the frequency channels or the number of the single frequency channel used for retransmission, the informing step of the frequency channel number for retransmission of the multicast signal is omitted, and each mobile station receives the retransmitted multicast signal in a channel of a frequency channel number with the maximum receiving quality out of the candidates for the frequency channel numbers.

The base station 401 can also transmit a new multicast signal entering the signal input terminal 404 in processing thereafter, using the numbers of the frequency channels or the number of the single frequency channel and the transmission power determined above.

As described above, the fourth embodiment described the case using the FDM transmission system as an example of the transmission system between the base station 401 and the mobile station 411, and besides, it is also possible to use the multicarrier transmission system, the OFDM transmission system, or the multiband transmission system as a transmission system between the base station 401 and the mobile station 411. For example, the base station 401 is notified of a number of a subcarrier channel and a receiving quality of the subcarrier channel in the case of the multicarrier transmission system being used; of a number of an orthogonal subcarrier channel and a receiving quality of the orthogonal subcarrier channel in the case of the OFDM transmission system being used; or of a number of a frequency channel in a frequency band and a receiving quality of the frequency channel in the frequency band in the case of the multiband transmission system being used, whereby the receiving quality at the mobile station 411 can be improved by the operation similar to that of the present embodiment.

According to the fourth embodiment of the present invention, as described above, the base station 401 determines the frequency channel number for retransmission of the multicast signal and the transmission power of the frequency channel on the basis of the frequency channel number and the C/I of the frequency channel notified of by each mobile station and thereafter retransmits the signal by the frequency channel number and transmission power thus determined. Therefore, the mobile station 411 can receive the retransmitted multicast signal with the required receiving quality even in a state under the influence of fading or shadowing. As a consequence, the repetition of repeat requests from the mobile station 411 is reduced, so as to enhance the throughput. The interference can be reduced with mobile stations not receiving the retransmitted multicast signal.

Figure 14:
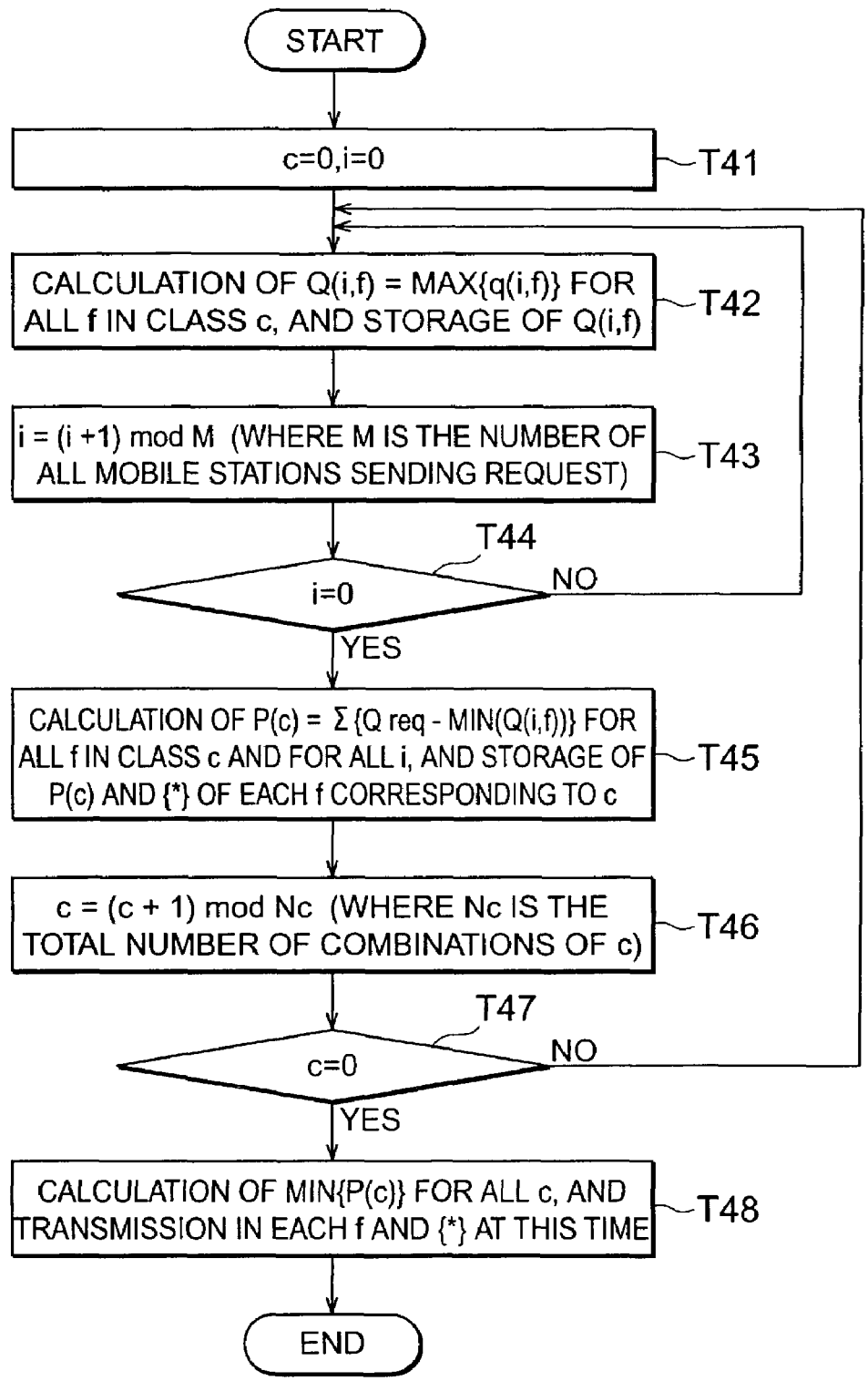
FIG. 14 is a flowchart showing the processing procedure of determining a number of a frequency channel and a transmission power of the frequency channel in the fourth embodiment of the present invention.

The following will describe an example of the procedure of determining the number of the frequency channel in the radio channel and the transmission power on the assumption of the mobile communication system in the present embodiment and with reference to FIG. 14.

Figure 15:
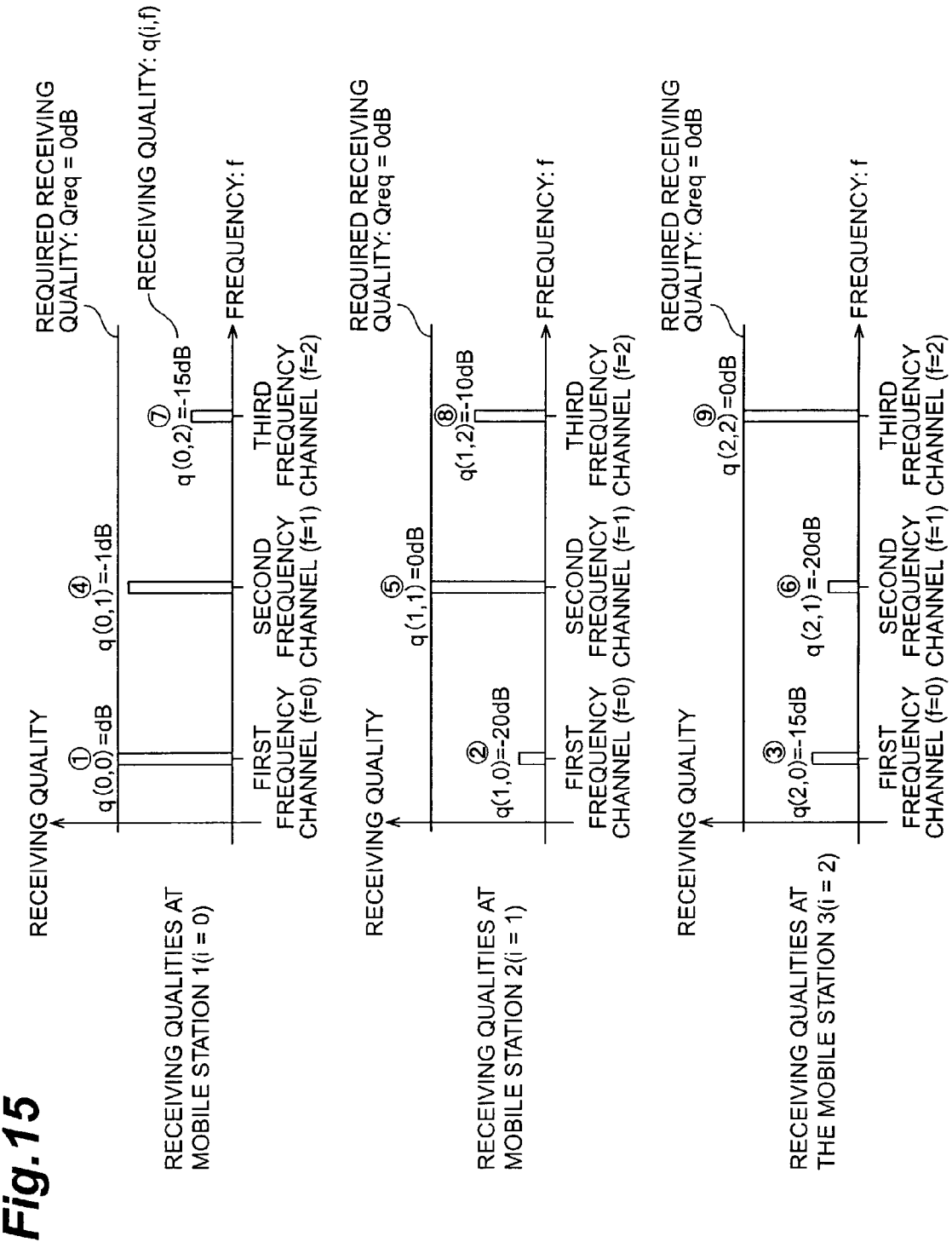
FIG. 15 is a diagram showing an example of receiving qualities of respective frequency channels at each of mobile stations in the fourth embodiment of the present invention.

The determination of the frequency channel number and the transmission power is done at the channel determiner 406 of the base station. FIG. 14 is a flowchart (algorithm) showing the processing procedure of determining the frequency channel number and the transmission power. FIG. 15 shows an example of receiving qualities of respective frequency channels at each of mobile stations 1 to 3.

For convenience of explanation, the following will describe an example in which the number of frequency channels available is three (f=0, 1, or 2). Since it is possible to select an arbitrary number of frequency channels up to three, there are seven combinations (c=0–6) of frequencies accordingly. The following description will be given on the presumption that the channel determiner 406 is already notified of the receiving qualities of the respective frequency channels at each of the mobile stations. For example, as shown in FIG. 15, the channel determiner 406 is assumed to be notified of the receiving qualities at the respective mobile stations 1–3.

FIG. 15 is a graph showing an example in which each mobile station 1–3 is monitoring the receiving qualities of signals of the first to third frequency channels transmitted from the base station 401, as described previously. In FIG. 15, the horizontal axis represents the frequency (f) and the vertical axis the receiving quality (dB). As shown in FIG. 15, for example, the mobile station 1 is in a state in which the receiving quality of the first frequency channel (f=0) is 0 dB, the receiving quality of the second frequency channel (f=1) −1 dB, and the receiving quality of the third frequency channel (f=2) −15 dB.

Similarly, the mobile station 2 is in a state in which the receiving quality of the first frequency channel (f=0) is −20 dB, the receiving quality of the second frequency channel (f=1) 0 dB, and the receiving quality of the third frequency channel (f=2) −10 dB. The mobile station 3 is in a state in which the receiving quality of the first frequency channel (f=0) is −15 dB, the receiving quality of the second frequency channel (f=1) −20 dB, and the receiving quality of the third frequency channel (f=2) 0 dB. In the present example, the required receiving quality (Qreq) at each mobile station 1–3 is assumed to be 0 dB.

As a premise of describing the flowchart of FIG. 14 herein, the following presents correspondence relations between the combinations of frequency channels f assumed to be used for retransmission, and c representing classes of the combinations.

c=0: f=0 (the first frequency channel being used)
c=1: f=1 (the second frequency channel being used)
c=2: f=2 (the third frequency channel being used)
c=3: f=0, 1 (the first and second frequency channels being used)
c=4: f=1, 2 (the second and third frequency channels being used)
c=5: f=0, 2 (the first and third frequency channels being used)
c=6: f=0, 1, 2 (the first, second, and third frequency channels being used)

In FIG. 14, the first step is to assume c=0, i.e., that only the first frequency channel is used, and set the mobile station 1 (i=0) as a mobile station (T41). Then calculation of (T42) is executed. At T42, MAX{q(i,f)} is calculated. Here q(i,f) indicates the receiving quality of the frequency channel f at the mobile station i. Further, MAX{q(i,f)} indicates maximum q(i,f) among all the frequency channels f in the combination class c of the frequency channels at the mobile station i. In the present example, at i=0, the maximum receiving frequency in the case of c=0 is given at f=0, and thus the calculation is done as follows:

$$Q(0,0)=q(0,0)=0 \text{ dB}$$

(reference is made to 1 in a circle in FIG. 15).

After q(0,0) is acquired in this way, the flow proceeds to next (T43) to increment i by "1" (i=1, the mobile station 2). At this (T43), the modulo arithmetic is carried out, and thus i is incremented until a remainder in division of (i+1) by M number of all mobile stations sending a request) becomes zero. Therefore, 1 mod 3(=M) at this point, which results in i≠0. Thus the determination at T44 is NO, so that the processing from T42 is carried out again. This means that the processing of T42 to T43 is repeatedly carried out until i becomes equal to M (before i=3).

Accordingly, since the determination at T44 is NO, the flow returns to T42 to execute the calculation of MAX{q(i, f)} for the mobile station 2 (i=1). Then the result below is obtained (reference is made to 2 in a circle in FIG. 15).

$$Q(1,0)=\text{MAX}\{q(1,0)\}=-20\text{ dB}$$

Further, the calculation for i=2 (mobile station 3) is also carried out in much the same manner as the above procedure, and the following result is obtained.

$$Q(2,0)=\text{MAX}\{q(2,0)\}=-15\text{ dB}$$

(reference is made to 3 in a circle in FIG. 15).

After T42 is executed in this way (c=0) for all the mobile stations (i=0–2), the determination at T44 results in i=0 (YES at T44), and then the flow proceeds to next T45.

At this T45, $P(c)=\Sigma\{(Qreq-\text{MIN}(Q(i,f))\}$ is calculated as follows. In this equation, Qreq represents the required receiving quality, and P(c) the transmission power from the base station in the case of the combination class of frequency channels being c.

In the case of c=0, the calculation is carried out as follows.

$$P(0)=Qreq-\text{MIN}\{Q(0,0), Q(1,0), Q(2,0)\}$$

$$=0\text{ dB}-\text{MIN}\{0\text{ dB}, -20\text{ dB}, -15\text{ dB}\}$$

$$=0\text{ dB}-(-20\text{ dB})$$

$$=+20\text{ dB}$$

Accordingly, for c=0, the calculation results in P(0)=+20 dB.

After completion of the calculation of P(c) in the case of c=0 in this way, the flow proceeds to next T46 to increment the combination class c of frequency channels. At this point, c becomes 1 mod 6 (Nc) and thus c≠0, leading to NO as the result of the determination at (T47). Thus the processing from (T42) is executed again. Namely, the processing of T42 to T46 is repeatedly carried out until c becomes equal to Nc (before c=6 in the present example).

The following presents the results of the calculations of Q(i,f) and P(c) executed in much the same manner as the above-stated procedure, for c=1 to c=6.

In the case of c=1)
Q(0,1)=MAX{q(0,1)}=−1 dB (cf. 4 in a circle in FIG. 15)
Q(1,1)=MAX{q(1,1)}=0 dB (cf. 5 in a circle in FIG. 15)
Q(2,1)=MAX{q(2,1)}=−20 dB (cf. 6 in a circle in FIG. 15)

$$P(1)=Qreq-\text{MIN}\{Q(0,1), Q(1,1), Q(2,1)\}$$

$$=0\text{ dB}-\text{MIN}\{-1\text{ dB}, 0\text{ dB}, -20\text{ dB}\}$$

$$=0\text{ dB}-(-20\text{ dB})$$

$$=+20\text{ dB}$$

In the case of c=2)
Q(0,2)=MAX{q(0,2)}=−15 dB (cf. 7 in a circle in FIG. 15)
Q(1,2)=MAX{q(1,2)}=−10 dB (cf. 8 in a circle in FIG. 15)
Q(2,2)=MAX{q(2,2)}=0 dB (cf. 9 in a circle in FIG. 15)

$$P(2)=Qreq-\text{MIN}\{Q(0,2), Q(1,2), Q(2,2)\}$$

$$=0\text{ dB}-\text{MIN}\{-15\text{ dB}, -10\text{ dB}, 0\text{ dB}\}$$

$$=0\text{ dB}-(-15\text{ dB})$$

$$=+15\text{ dB}$$

In the case of c=3)

$$Q(0,0)=\text{MAX}\{q(0,0), q(0,1)\}=q(0,0)=0\text{ dB}$$

$$Q(1,0)=\text{MAX}\{q(1,0), q(1,1)\}=q(1,1)=0\text{ dB}$$

$$Q(2,0)=\text{MAX}\{q(2,0), q(2,1)\}=q(2,0)=-15\text{ dB}$$

$$P(3)=Qreq-\text{MIN}\{Q(0,0), Q(2,0)\}+Qreq-\text{MIN}\{Q(1,1)\}$$

$$=0\text{ dB}-\text{MIN}\{0\text{ dB}, -15\text{ dB}\}+0\text{ dB}-\text{MIN}(0\text{ dB})$$

$$=(+15\text{ dB})+(0\text{ dB})$$

$$\approx+15.1\text{ dB}$$

The above sum of (+15 dB) and (0 dB) is given by a logarithm of the sum of antilogarithms of (+15 dB) and (0 dB).

The antilogarithm of (0 dB) is "1" and the antilogarithm of (+15 dB) is "≈31.6." Thus the sum x of these is given as follows.

$$x=1+31.6=32.6$$

$$\therefore 10\log x=10\log 32.6.\approx+15.1\text{ dB}.$$

In the case of c=4)

$$Q(0,1)=\text{MAX}\{q(0,1), q(0,2)\}=q(0,1)=-1\text{ dB}$$

$$Q(1,1)=\text{MAX}\{q(1,1), q(1,2)\}=q(1,1)=0\text{ dB}$$

$$Q(2,2)=\text{MAX}\{q(2,1), q(2,2)\}=q(2,2)=0\text{ dB}$$

$$P(4)=Qreq-\text{MIN}\{Q(0,1), Q(1,1)\}+Qreq-\text{MIN}\{Q(2,2)\}$$

$$=0\text{ dB}-\text{MIN}\{-1\text{ dB}, 0\text{ dB}\}+0\text{ dB}-\text{MIN}(0\text{ dB})$$

$$=(+1\text{ dB})+(0\text{ dB})$$

$$\approx+3.5\text{ dB}$$

Just as in the above case, the sum of (+1 dB) and (0 dB) is given by a logarithm of the sum of antilogarithms of (+1 dB) and (0 dB).

The antilogarithm of (0 dB) is "1" and the antilogarithm of (+1 dB) is "≈1.26." Thus the sum x of these is given as follows.

$$\text{i } x=1+1.26=2.26$$

$$\therefore 10\log x=10\log 2.26\approx+3.5\text{ dB}.$$

In the case of c=5)

$$Q(0,0)=\text{MAX}\{q(0,0), q(0,2)\}=q(0,0)=0\text{ dB}$$

$$Q(1,2)=\text{MAX}\{q(1,0), q(1,2)\}=q(1,2)=-10\text{ dB}$$

$$Q(2,2)=\text{MAX}\{q(2,0), q(2,2)\}=q(2,2)=0\text{ dB}$$

$$P(5)=Qreq-\text{MIN}\{Q(0,0)\}+Qreq-\text{MIN}\{Q(1,2), Q(2,2)\}$$

$$=0\text{ dB}-\text{MIN}(0\text{ dB})+0\text{ dB}-\text{MIN}\{-10\text{ dB}, 0\text{ dB}\}$$

$$=(0\text{ dB})+(+10\text{ dB})$$

$$\approx+10.4\text{ dB}$$

Just as in the above case, the sum of (0 dB) and (+10 dB) is given by a logarithm of the sum of antilogarithms of (0 dB) and (+10 dB).

The antilogarithm of (0 dB) is "1" and the antilogarithm of (+10 dB) is "10." Thus the sum x of these is given as follows.

$x=1+10=11$ $\therefore 10 \log x = 10 \log 11 \approx 10.4$ dB.

In the case of c=6)

$Q(0,0)=\text{MAX}\{q(0,0), q(0,1), q(0,2)\}=q(0,0)=0$ dB $Q(1,1)=\text{MAX}\{q(1,0), q(1,1), q(1,2)\}=q(1,1)=0$ dB $Q(2,2)=\text{MAX}\{q(2,0), q(2,1), q(2,2)\}=q(2,2)=0$ dB $P(6)=Q\text{req}-\text{MIN}\{Q(0,0)\}+Q\text{req}-\text{MIN}\{Q(1,1)\}+Q\text{req}-\text{MIN}\{Q(2,2)\}$ $=0$ dB$-\text{MIN}(0$ dB$)+0$ dB$-\text{MIN}(0$ dB$)+0$ dB$-\text{MIN}(0$ dB$)$ $=(0$ dB$)+(0$ dB$)+(0$ dB$)$ $\approx +4.8$ dB Just as in the above case, the sum of (0 dB), (0 dB), and (0 dB) is given by a logarithm of the sum of antilogarithms of (0 dB), (0 dB), and (0 dB).

Since the antilogarithm of (0 dB) is "1," the sum x is given as follows.

$x=1+1+1=3$ $\therefore 10 \log x = 10 \log 3 \approx +4.8$ dB.

After completion of the calculations of P(0) to P(6) as described above, the flow proceeds to T48 to calculate MIN{P(c)}.

The following presents the calculation method of MIN{P(c)}.

$\text{MIN}\{P(c)\}=\text{MIN}\{P(0), P(1), P(2), P(3), P(4), P(5), P(6)\}$ $=\text{MIN}\{+20$ dB, $+20$ dB, $+15$ dB, $+15.1$ dB, $+3.5$ dB, $+10.4$ dB, $+4.8$ dB$\}$ Accordingly, the calculation at T48 obtains the following.

$\text{MIN}\{P(c)\}=P(4)=+3.5$ dB.

The above processing results in finally selecting the combination of frequency channels in c=4. Therefore, while the second frequency channel is set at the transmission power of +1 dB and the third frequency channel at the transmission power of 0 dB, the same multicast signal is retransmitted at each of the frequencies (the second and third frequencies).

As described above, the above processing permits the frequency channel number(s) minimizing the transmission power from the base station, and the transmission power(s) thereof to be determined while satisfying the required receiving quality at the mobile stations.

The present embodiment can also be applied to the mobile station functioning as a relay station instead of the base station, supposing the situation of multihop connection. In this case, the mobile station 411, which is a transmitting station of a repeat request, preliminarily identifies existence of an adjoining mobile station as relay station and requests retransmission of a signal by designating a transmission path including the mobile station (relay station). Similarly, the base station 401, which is a transmitting station of the signal according to the repeat request, preliminarily identifies existence of an adjoining mobile station as a relay station and responds to the repeat request by designating a transmission path including the mobile station (relay station).

Fifth Embodiment

Lastly, the fifth embodiment of the present invention will be described with reference to the block diagram of FIG. 16. The present embodiment employs the NACK base automatic repeat request not to send an arrival acknowledgement but to send only a repeat request, and the base station is configured to receive multicast signals of packet units and send them in the multicarrier transmission system. The following will describe an example of combination with a method using spreading codes for repeat requests and thereby permitting detection of repeat requests and numbers of packets under the repeat request even with occurrence of collision between repeat request signals at the base station.

The method capable of detecting the repeat requests even with occurrence of collision between repeat requests is disclosed in International Patent Application (PCT/JP01/02923).

Figure 16:
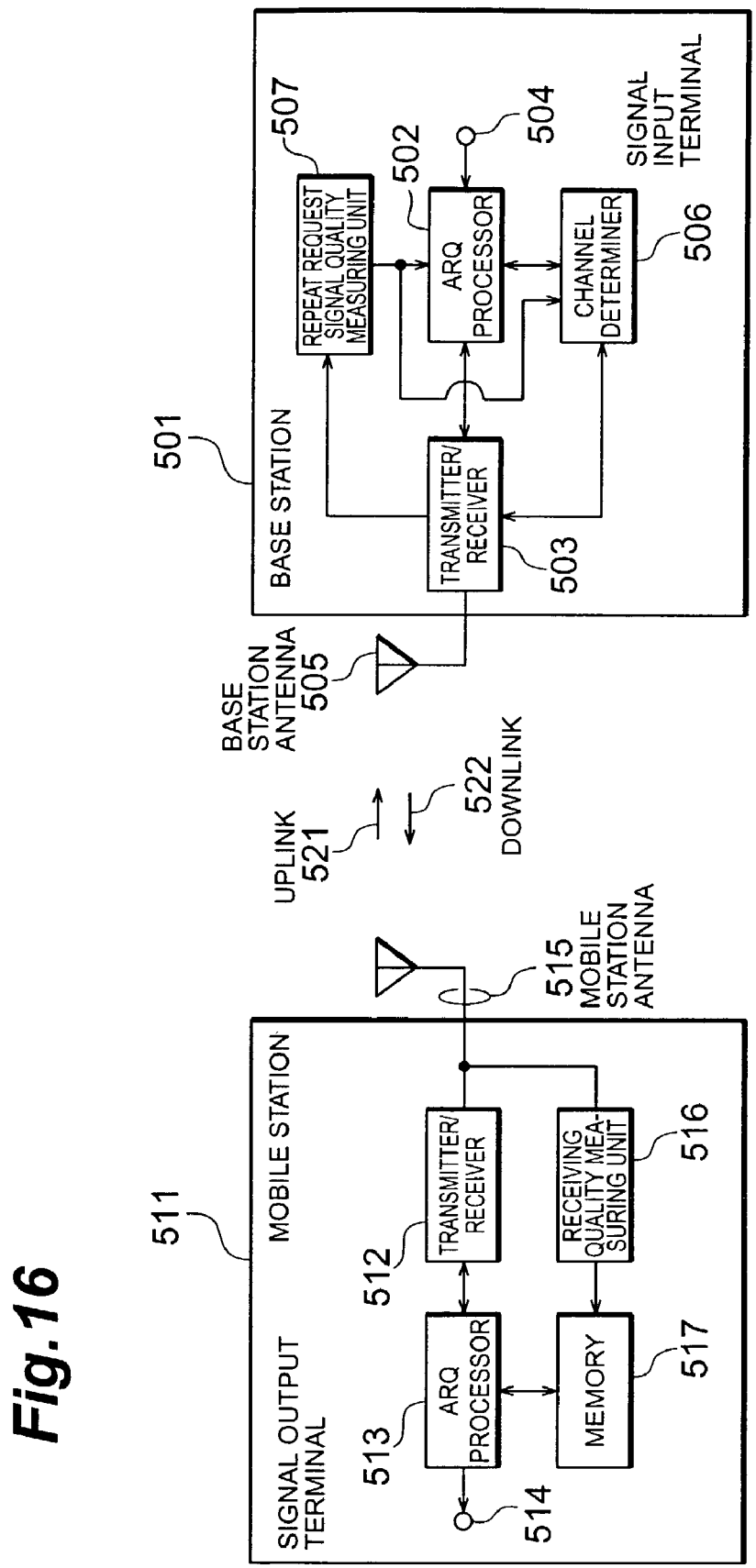
FIG. 16 is a block diagram of a mobile communication system in the fifth embodiment to which the signal transmitting method of the present invention is applied.

FIG. 16 is a block diagram of the mobile communication system in the present embodiment, which is generally comprised of a base station 501 and a mobile station 511, as in the first embodiment and the second embodiment described above. The base station 501 comprises an ARQ processor 502, a transmitter/receiver 503, a signal input terminal 504, a base station antenna 505, a channel determiner 506, and a repeat request signal quality measuring unit 507. The mobile station 511 comprises a transmitter/receiver 512, an ARQ processor 513, a signal output terminal 514, a mobile station antenna 515, a receiving quality measuring unit 516, and a memory 517.

At the base station 501, packets of a multicast signal entering the signal input terminal 504 are fed into the ARQ processor 502. The ARQ processor 502 attaches the CRC to the input packets and outputs them to the transmitter/receiver 503. The transmitter/receiver 503 informs each mobile station of a start of transmission of the packets and a number of a subcarrier used for the transmission of the packets and thereafter transmits the packets through the downlink 522 to the mobile station 511.

On the other hand, at the mobile station 511, the receiving quality measuring unit 516 continuously, constantly measures as the receiving quality, S/(N+I) of each subcarrier transmitted from the base station 501 and stores the correlation between the subcarrier number and S/(N+I) of the subcarrier thus measured, in the memory 517.

At the mobile station 511 in this configuration, the packets transmitted from the base station 501 are received through the downlink 522 by the transmitter/receiver 512 and thereafter are outputted to the ARQ processor 513. The ARQ processor 513 performs the error detection of the received packets using the CRC. When no error is detected in the received packets, the ARQ processor 513 outputs the packets from the signal output terminal 514. Since the NACK base automatic repeat request is employed, no arrival acknowledgement is sent to the base station 501 when no error is detected.

When an error is detected in the received packets, the ARQ processor 513 notifies the base station 501 through the uplink 521 of a repeat request for retransmission of a requested packet and the subcarrier number with the maximum receiving quality stored in the memory 517. The present embodiment will describe an example of a method of selecting a channel number with a receiving quality within a certain range as a subcarrier number with the maximum receiving quality at each mobile station and notifying the base station of only the subcarrier thereafter. Spreading codes are used for packet numbers under repeat requests and numbers of subcarriers used for transmission of retransmitted packets. For example, in the case where 256 spreading codes are available, 128 spreading codes can be allocated to identification of packet numbers, and 128 spreading codes to identification of subcarrier numbers. Namely, in this case, a number of a spreading code transmitted from the mobile station 511 to the base station 501 can be determined by the following calculation.

Number of spreading code=(packet number)+(subcarrier number)×16

For example, in the case where the retransmitted packet number is "8" and the subcarrier number for the repeat request of the retransmitted packet is "3," 8+3×16=56, and thus the mobile station transmits the fifty sixth spreading code as a repeat request signal. This makes a judgment on a repeat request feasible using a correlation value by the spreading code or a level of a signal obtained by the despreading operation as a receiving quality even if collision occurs between repeat request signals at the base station 501. Accordingly, the base station 501 can detect the repeat request for retransmission of the eighth packet through the use of the third subcarrier.

For the spreading code transmitted from the mobile station 511, the repeat request signal quality measuring unit 507 of the base station 501 detects the retransmitted packet number and subcarrier number. The repeat request signal quality measuring unit 507 notifies the ARQ processor 502 of the retransmitted packet signal detected and notifies the channel determiner 506 of the subcarrier number requested to use in retransmission. Then the ARQ processor 502 searches for a packet number with the largest number of repeat requests and thereafter controls the transmitter/receiver 503 so as to retransmit the packet by the subcarrier number thus searched for. The transmitter/receiver 503 informs the mobile station of the retransmission using the subcarrier number and thereafter transmits the retransmitted packet fed from the ARQ processor 502, using the subcarrier.

As described above, the receiving quality at the mobile station can be improved by the configuration and operation of the mobile communication system in the present embodiment.

According to the mobile communication system in the present embodiment, the base station 501 receives from the mobile station 511 the repeat request signal assigned by the spreading code and thus, even with occurrence of collision between repeat request signals at the base station 501, the base station 501 can detect each repeat request for retransmission of which packet using which subcarrier, by determining the correlation value of the spreading code. Since the packet with the greatest number of repeat requests is retransmitted using the subcarrier with the greatest number of requests (the subcarrier with the maximum receiving quality), the mobile station can receive the packet with the required receiving quality under the repeat request. As a consequence, the repetition of repeat requests from the mobile station can be reduced, so as to enhance the throughput.

The present embodiment can also be applied to the mobile station functioning as a relay station instead of the base station, supposing the situation of multihop connection. In this case, the mobile station 511, which is a transmitting station of a repeat request, preliminarily identifies existence of an adjoining mobile station as relay station and requests retransmission of a signal by designating a transmission path including the mobile station (relay station). Similarly, the base station 501, which is a transmitting station of the signal according to the repeat request, preliminarily identifies existence of an adjoining mobile station as a relay station and responds to the repeat request by designating a transmission path including the mobile station (relay station).

In each of the above embodiments, the receiving quality measuring function of the receiving quality measuring unit 316, 416, 516 in the mobile station 311, 411, 511 corresponds to the receiving quality measuring means, and the receiving quality transmitting function of the transmitter/receiver 312, 412, 512 to the receiving quality notifying means.

The transmitting function of the transmitter/receiver 303, 403, 503 in the base station 301, 401, 501 corresponds to the transmitting means; the channel determining function of the channel determiner 306, 406, 506 corresponds to the radio channel determining means and to the first, second, and third channel number determining means. Further, the transmission power calculating function of the channel determiner 306, 406, 506 corresponds to the first and second radio channel transmission power determining means.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. A mobile communication system comprising:
   a mobile station, and
   a base station configured to perform transmission/reception of a signal while sending and receiving an automatic repeat request,
   wherein said mobile station comprises:
   a receiving quality measuring unit configured to measure a quality of a radio signal transmitted from the base station; and
   a transmitter configured to transmit a radio resource use request to said base station to request use of a radio resource adapted to a receiving quality, based on the quality of the radio signal, and
   wherein said base station comprises:
   a receiver configured to receive said radio resource use request; and
   a transmitter configured to transmit a signal addressed to said mobile station, including a signal under a request for retransmission by said automatic repeat request, using the radio resource requested by said radio resource use request wherein,
   said transmitter in said base station transmits the signal addressed to said mobile station by using radio resources in decreasing order of a number of repeat requests from the mobile station.

2. The mobile communication system according to claim 1, wherein said quality is one selected from the following:
   a received power;

$$C/(I+N) \qquad \text{(Eq. 1)}$$

C: carrier power
I: interference power
N: noise power;

$$S/(I+N) \quad \text{(Eq. 2)}$$

S: signal power
I: interference power
N: noise power;

$$C/N \quad \text{(Eq. 3)}$$

C: carrier power
N: noise power;

$$S/N \quad \text{(Eq. 4)}$$

S: signal power
N: noise power;
an error rate;
a likelihood obtained in decoding of error correction code;
a transmission power value of the base station;
an increase amount or an attenuation amount of the transmission power of the base station;
a correlation value obtained by despreading of spreading code;
either of combinations of these.

3. The mobile communication system according to claim 1, wherein said radio resource is at least one of an antenna, directivities of at least one antenna, a radio channel, and a transmission path.

4. A mobile communication system comprising:
a mobile station, and
a base station equipped with a plurality of antennas, and configured to perform signal transmission/reception control including signal retransmission control by the base station on the basis of an automatic repeat request from the mobile station,
wherein said mobile station comprises:
a quality measuring unit configured to measure receiving qualities of signals transmitted from the plurality of antennas of said base station; and
a transmitter configured to transmit an antenna use request to said base station that a signal should be transmitted from at least one antenna out of said plurality of antennas, based on the receiving qualities of the signals from the respective antennas obtained by measurement, and
wherein said base station comprises:
a receiver configured to receive the antenna use request that the signal should be transmitted from at least one antenna out of said plurality of antennas; and
a transmitter configured to transmit a signal addressed to said mobile station, including the signal under said automatic repeat request for retransmission, from the antenna requested by said antenna use request
wherein, when antenna use requests from a plurality of mobile stations are present over two or more antennas, said transmitter configured to transmit the signal transmits the signal by using the antennas in decreasing order of a number of antenna use requests.

5. A mobile communication system comprising:
a plurality of mobile stations, and
a base station equipped with a plurality of antennas and configured to perform signal transmission/reception control including signal retransmission control by the base station on the basis of an automatic repeat request from a mobile station,
wherein said mobile station comprises:
a quality measuring unit configured to measure receiving qualities of signals transmitted from the plurality of antennas of said base station; and
a transmitter configured to transmit an antenna use request to said base station that a multicast signal should be transmitted from at least one antenna out of said plurality of antennas, based on the receiving qualities of the signals from the respective antennas obtained by measurement, and
wherein said base station comprises:
a receiver configured to receive the antenna use request that the multicast signal should be transmitted from at least one antenna out of said plurality of antennas; and
a transmitter configured to transmit a multicast signal addressed to said mobile station, including the multicast signal under said automatic repeat request for retransmission, from the antenna requested by said antenna use request wherein,
when antenna use requests from the plurality of mobile stations are present over two or more antennas, said transmitter configured to transmit a multicast signal transmits the multicast signal by using the antennas in decreasing order of a number of antenna use requests.

6. The mobile communication system according to claim 4, wherein when receiving said antenna use request, said base station performs reception in an antenna diversity system.

7. The mobile communication system according to claim 4, wherein said quality measuring unit measures said receiving qualities at least one of a synchronization signal, a signal of annunciation information, an individual signal to the mobile station, and a multicast signal transmitted from at least one antenna of said base station.

8. The mobile communication system according to claim 4, wherein said receiving qualities include at least one of a received power, a value obtained by dividing a carrier power by the sum of an interference power and a noise power, a value obtained by dividing a signal power by the sum of an interference power and a noise power, an error rate, a likelihood obtained in decoding of error correction code, a C/N ratio, an S/N ratio, and a correlation value obtained by despreading of spreading code.

9. A mobile communication method which is executed by a mobile communication system comprising a mobile station, and a base station equipped with a plurality of antennas, and which is configured to perform signal transmission/reception control including signal retransmission control by the base station on the basis of an automatic repeat request from the mobile station, said mobile communication method comprising:
a quality measuring step of, at said mobile station, measuring receiving qualities of signals transmitted from the plurality of antennas of said base station;
a request transmitting step of, at said mobile station, transmitting to said base station an antenna use request that a signal should be transmitted from at least one antenna out of said plurality of antennas, based on the receiving qualities of the signals from the respective antennas obtained by the quality measuring step;
a request receiving step of, at said base station, receiving the antenna use request that the signal should be transmitted from at least one antenna out of said plurality of antennas; and
a signal transmitting step of, at said base station, transmitting a signal addressed to said mobile station, including the signal under said automatic repeat request for retransmission, from the antenna requested by said antenna use request wherein,
in said signal transmitting step, when antenna use requests from a plurality of mobile station present over two or more antennas, said base station transmits the signal by using the antennas in descending order of the number of requests.

10. A mobile communication method which is executed by a mobile communication system comprising a plurality of mobile stations, and a base station equipped with a plurality of antennas and which is configured to perform signal transmission/reception control including signal retransmission control by the base station on the basis of an automatic repeat request from a mobile station, said mobile communication method comprising:
- a quality measuring step of, at said mobile station, measuring receiving qualities of signals transmitted from the plurality of antennas of said base station;
- a request transmitting step of, at said mobile station, transmitting to said base station an antenna use request that a multicast signal should be transmitted from at least one antenna out of said plurality of antennas, based on the receiving qualities of the signals from the respective antennas obtained by the quality measuring step;
- a request receiving step of, at said base station, receiving the antenna use request that the multicast signal should be transmitted from at least one antenna out of said plurality of antennas; and
- a multicast signal transmitting step of, at said base station, transmitting a multicast signal addressed to said mobile station, including the multicast signal under said automatic repeat request for retransmission, from the antenna requested by said antenna use request wherein,
- in said multicast signal transmitting step, when antenna use requests from the plurality of mobile stations are present over two or more antennas, said base station transmits the multicast signal by using the antennas in descending order of the number of requests.

11. The mobile communication method according to claim 9, wherein in said request receiving step, when receiving said antenna use request, said base station performs antenna reception in a diversity system.

12. The mobile communication method according to claim 9, wherein in said quality measuring step, said mobile station measures said receiving quality by using a synchronization signal, a signal of annunciation information, an individual signal to the mobile station, a multicast signal, or a combination of two or more out of these, transmitted from at least one antenna of said base station.

13. The mobile communication method according to claim 9, wherein said receiving quality is a received power, a value obtained by dividing a carrier power by the sum of an interference power and a noise power, a value obtained by dividing a signal power by the sum of an interference power and a noise power, an error rate, a likelihood obtained in decoding of error correction code, a C/N ratio, an S/N ratio, a correlation value obtained by despreading of spreading code, or a combination of two or more out of these.

14. A base station which is equipped with a plurality of antennas, constituting a mobile communication system, together with a mobile station requesting to transmit a signal from at least one antenna out of said plurality of antennas on the basis of receiving qualities of signals transmitted from the plurality of antennas, and which is configured to perform, with said mobile station, signal transmission/reception control including signal retransmission control based on an automatic repeat request from said mobile station, said base station comprising:
- a receiver configured to receive an antenna use request that a signal should be transmitted from at least one antenna out of said plurality of antennas; and
- a transmitter configured to transmit a signal addressed to said mobile station, including the signal under said automatic repeat request for retransmission, from the antenna requested by said antenna use request wherein,
- when antenna use requests from a plurality of mobile stations are present over two or more antennas, said transmitter configured to transmit said signal transmits the signal by using the antennas in decreasing order of the number of requests.

15. A base station which is equipped with a plurality of antennas, constituting a mobile communication system, together with a plurality of mobile stations requesting to transmit a multicast signal from at least one antenna out of said plurality of antennas on the basis of receiving qualities of signals transmitted from the plurality of antennas, and which is configured to perform, with said mobile stations, signal transmission/reception control including multicast signal retransmission control based on an automatic repeat request from the mobile stations, said base station comprising:
- a receiver configured to receive an antenna use request that a multicast signal should be transmitted from at least one antenna out of said plurality of antennas; and
- a transmitter configured to transmit a multicast signal addressed to said mobile station, including the multicast signal under said automatic repeat request for retransmission, from the antenna requested by said antenna use request wherein,
- when antenna use requests from the plurality of mobile stations are present over two or more antennas, said transmitter configured to transmit said multicast signal transmits the multicast signal by using the antennas in decreasing order of the number of requests.

16. The base station according to claim 14, wherein when receiving said antenna use request, said receiver configured to receive an antenna use request performs antenna reception in a diversity system.

* * * * *